(12) United States Patent
Castejon-Amenedo et al.

(10) Patent No.: US 7,302,457 B2
(45) Date of Patent: Nov. 27, 2007

(54) METHOD AND APPARATUS FOR PROVIDING RANDOM BITS

(75) Inventors: Jose Castejon-Amenedo, San Jose, CA (US); Richard Alan McCue, Palo Alto, CA (US); Borislav Hristov Simov, Cupertino, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 748 days.

(21) Appl. No.: 10/706,181

(22) Filed: Nov. 12, 2003

(65) Prior Publication Data

US 2005/0102336 A1 May 12, 2005

(51) Int. Cl.
*G06F 7/58* (2006.01)

(52) U.S. Cl. .................... 708/250; 708/255

(58) Field of Classification Search ........... 708/250, 708/255
See application file for complete search history.

(56) References Cited

U.S. PATENT DOCUMENTS

| 6,871,206 | B2 * | 3/2005 | Henry et al. ........... 708/250 |
| 6,968,460 | B1 * | 11/2005 | Gulick ................ 713/194 |
| 2004/0064491 | A1 * | 4/2004 | Rarick ................ 708/250 |

* cited by examiner

*Primary Examiner*—D. H. Malzahn

(57) ABSTRACT

Method and apparatus for providing random bits are described. In one embodiment, random bits are provided by storing a succession of random bits in a buffer. A quantity of bits is selected from the buffer at a source location and used as a basis of a new quantity of random bits. The content of the buffer is altered and the source location is advanced to the next position in the buffer. The source location is placed at the beginning of the buffer plus an offset when the next location is beyond the limit of the buffer.

56 Claims, 19 Drawing Sheets

METHOD AND APPARATUS FOR PROVIDING RANDOM BITS

BACKGROUND

Random numbers are difficult to generate in a digital environment that constitutes a computer platform. With the expansion of computer networking, the need for secure network transactions is on the rise. Secure network transactions often depend on encryption algorithms. These encryption algorithms require copious amounts of random bits as they operate to provide secure network transactions. Some encryption algorithms require truly random bits in order to provide high levels of security.

Truly random numbers are generally attainable through the use of a hardware-based random number generator embodied as a peripheral that can be accessed by a computer. A hardware-based random number generator typically relies on some natural phenomenon as a source of entropy. For example, one example of a hardware-based random number generator uses radioactive decay as a source of entropy. Yet another example of a hardware-based random number generator relies on thermal noise as a source of entropy. The term "entropy" refers to the state of disorder in a system and is considered to be one metric by which the randomness of a random number is measured.

Given that a random number is attainable in a computing environment, there are some other problems associated with the use of random numbers. For example, where a process needs random numbers in order to function properly, that process, which is also known as a consumer (or consuming) process, may require random numbers at a rate that is significantly greater than a random number generator can provide. In this scenario, the random number generator, which is also known as a producer, is simply not able to keep up with the quantity of random numbers demanded by the consumer.

One manner in which this problem has been overcome in the past was through the use of a buffer. Accordingly, a producer would populate a buffer with random numbers as quickly as possible. The hope was to have a sufficient quantity of random numbers available in the buffer by the time a consumer needed them. Unfortunately, this method only serves to smooth out the demand over time, but it simply does not solve the problem of "too little, too late". Hence, in any situation where demand for random number truly exceeds supply, the buffer does not really help.

Many have attempted to resuscitate the buffer concept just described by allowing the buffer to continually provide "random numbers", even if the same random number was previously supplied to the consuming process. This, of course, would provide a continuous flow of numbers to the consuming process even if the producer could not keep up with demand. The problem with this concept is a matter of quality. By providing a consuming process with a number that was already provided, the quality of randomness (i.e. the entropy) of the overall system is compromised.

SUMMARY

Method and apparatus for providing random bits are described. In one embodiment, random bits are provided by storing a succession of random bits in a buffer. A quantity of bits is selected from the buffer at a source location and used as a basis of a new quantity of random bits. The content of the buffer is altered and the source location is advanced to the next position in the buffer. The source location is placed at the beginning of the buffer plus an offset when the next location is beyond the limit of the buffer.

BRIEF DESCRIPTION OF THE DRAWINGS

Several alternative embodiments will hereinafter be described in conjunction with the appended drawings and figures, wherein like numerals denote like elements, and in which.

DETAILED DESCRIPTION

Figure 1:
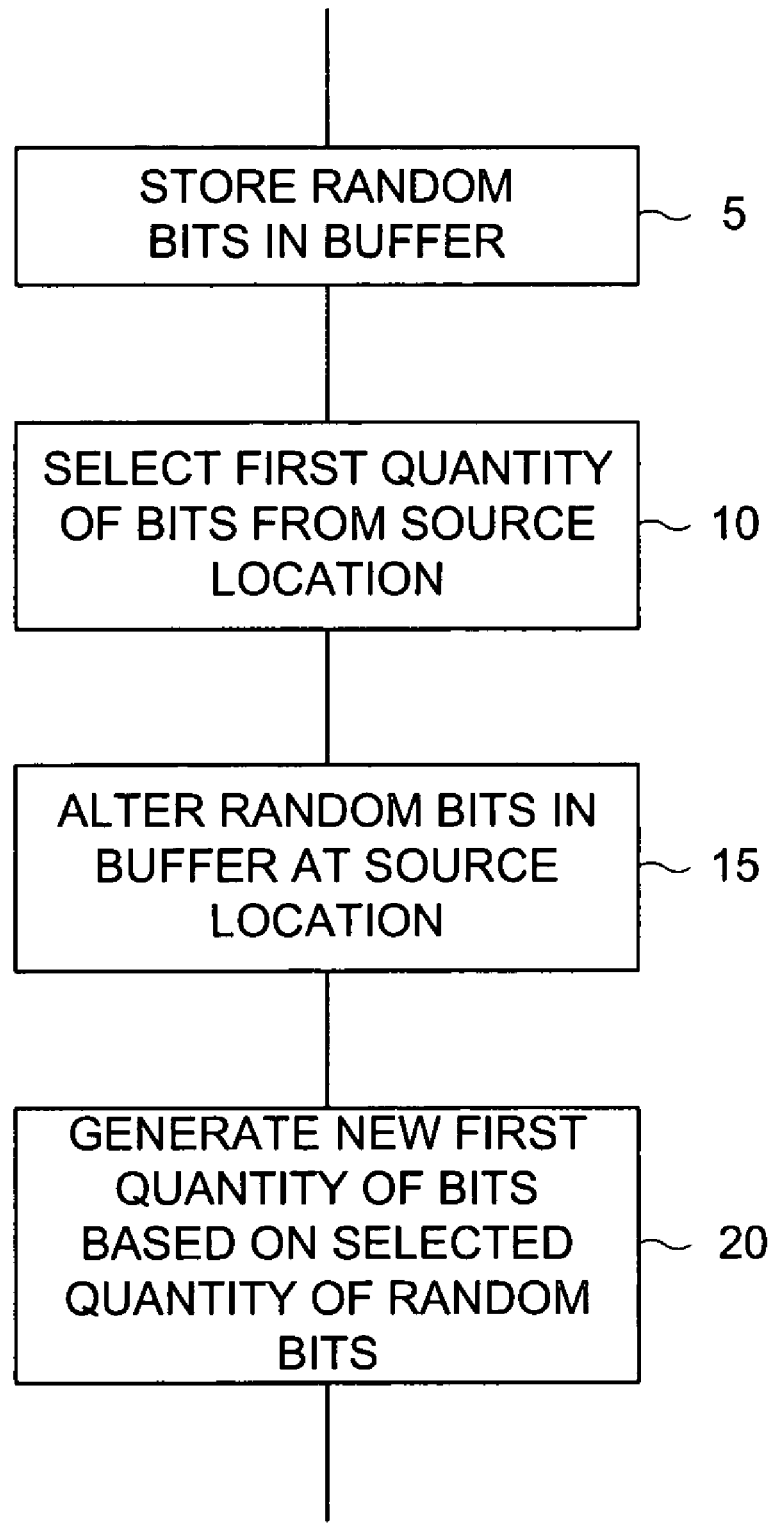
FIGS. 1 and 2 collectively constitute a flow diagram that depicts one example method for providing random bits.
Figure 2:
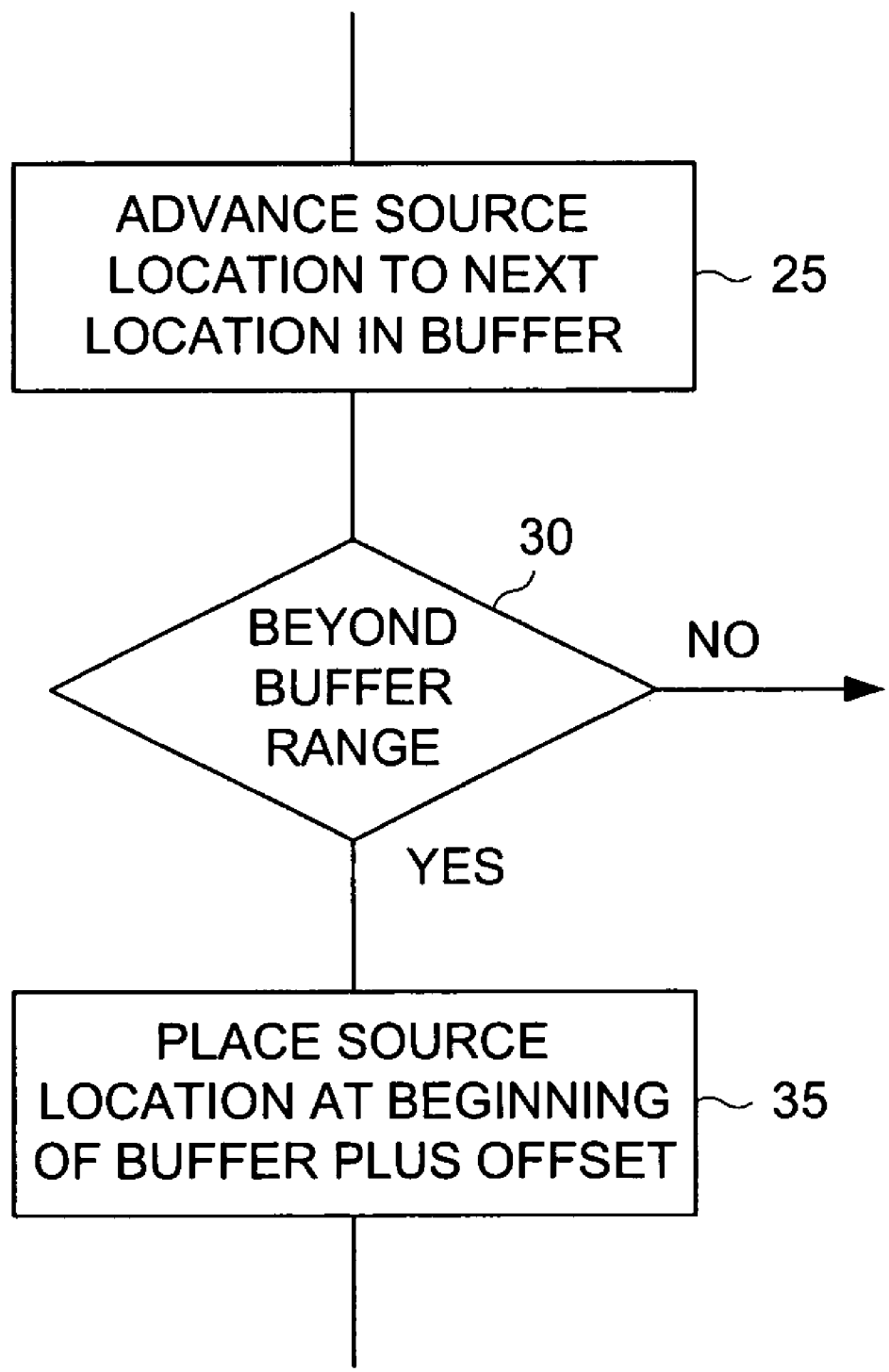

FIGS. 1 and 2 collectively constitute a flow diagram that depicts one example method for providing random bits. According to this example method, random bits are provided by storing random bits in a buffer (step 5). The random bits, according to one example variation of the present method, are received from a random number generator. Any suitable random number generator may be used, including but not limited to a random number generator that relies on a hardware device for entropy (e.g. a counter or a thermal noise device).

Once random bits are placed in the buffer, a quantity of random bits is then retrieved from the buffer at a source location (step 10). It should be noted that the act of retrieving random bits does not clear the source location in the buffer. The random bits in the buffer at the source location are altered (step 15). A new quantity of random bits is generated based on the first selected quantity of random bits (step 20). According to this example method, the source location for the buffer is then advanced to the next location in the buffer (step 25). In the event that the next location in the buffer is beyond the range of the buffer (step 30), the source location is placed at the beginning of the buffer plus an offset (step 35).

In operation, the present method may be applied as a buffering mechanism between a source of random bits, often referred to as a "producer", and a process that requires said random bits. The process that requires the random bits is often referred to as a "consumer". Hence, the buffering mechanism provided by the present method enables a producer to produce random bits at a particular "supply" rate. The consumer is then able to retrieve random bits from the buffer at a particular and perhaps different "demand" rate. Generally, the supply rate must be at least equal to the demand rate over some period of time. However, there are cases where the consumer may exhibit a non-uniform demand over this same period of time. Accordingly, the producer may not be capable of supplying peaks in the demand for random bits exhibited by the consumer.

Figure 3:
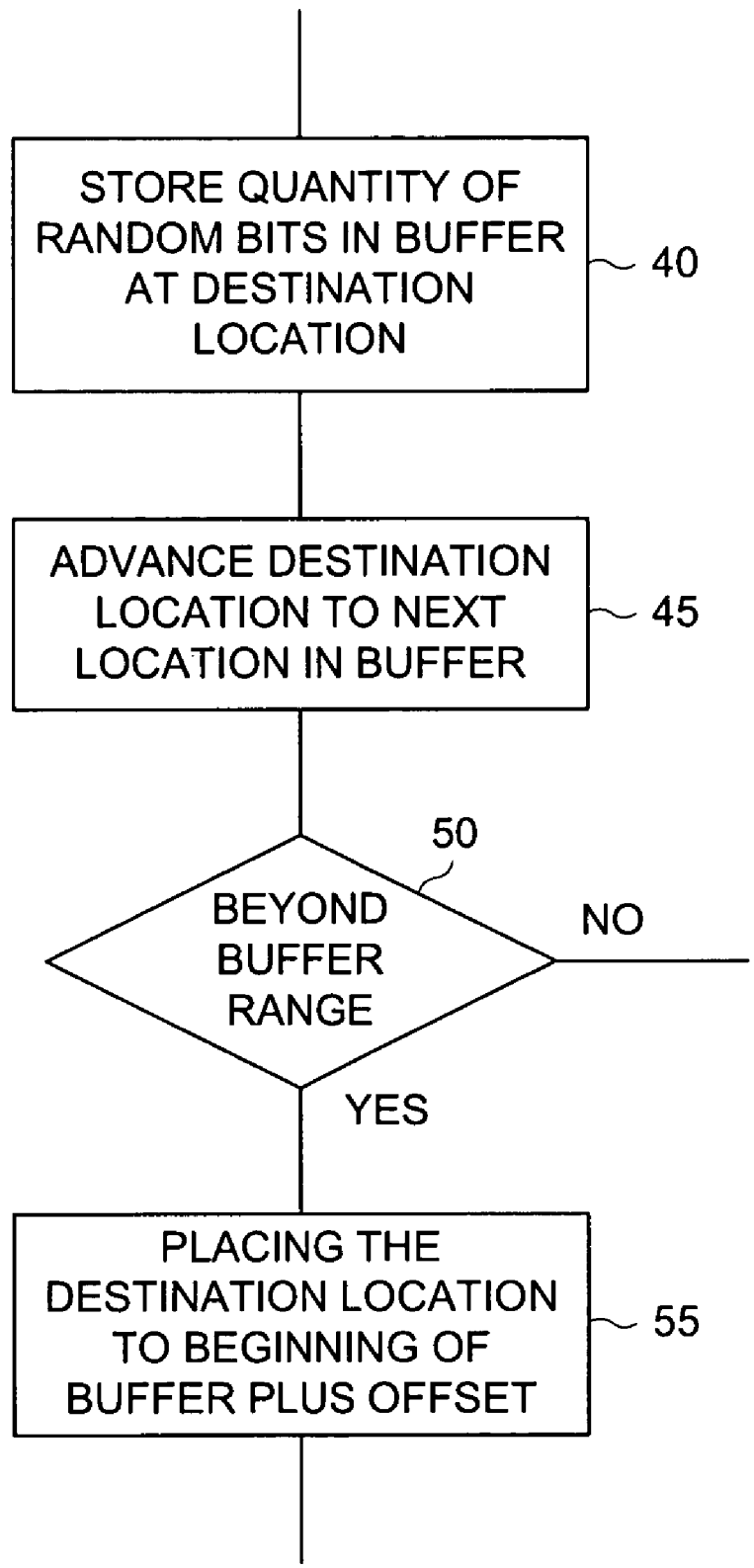
FIG. 3 is a flow diagram that depicts one alternative illustrative method for storing a succession of random bits in a buffer.

FIG. 3 is a flow diagram that depicts one alternative illustrative method for storing a succession of random bits in a buffer. According to this alternative illustrative method, a quantity of random bits is stored in a buffer at a destination location (step 40). The destination location is then advanced to the next location in the buffer (step 45). In the event that the next location in the buffer is beyond the range of the buffer (step 50), the destination location is placed to the beginning of the buffer plus an offset (step 55).

Figure 4:
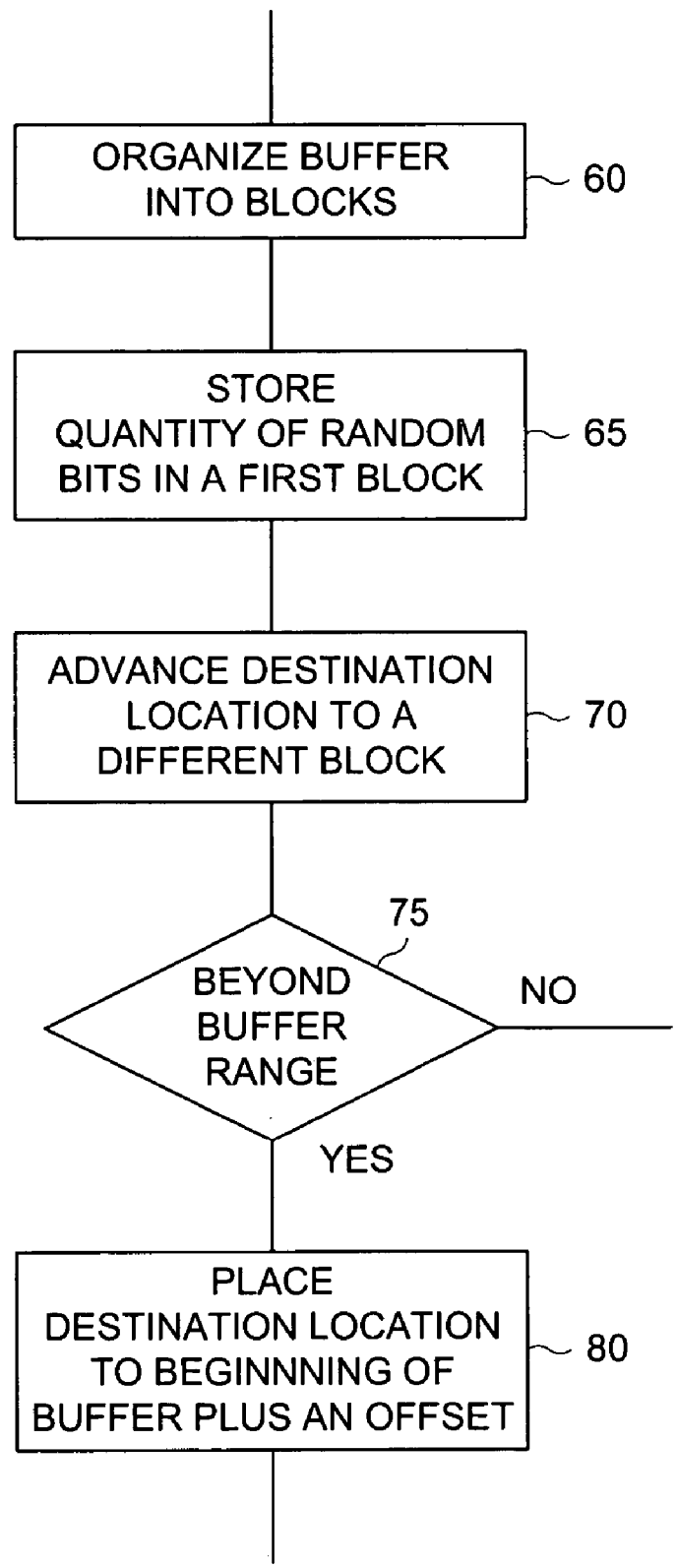
FIG. 4 is a flow diagram that depicts yet another alternative method for storing random bits in a buffer.

FIG. 4 is a flow diagram that depicts yet another alternative method for storing random bits in a buffer. According to this alternative method, a buffer is first organized into blocks (step 60). According to one aspect of this alternative method, random bits are stored into a first block in the buffer (step 65) at a destination location. In order to assure that each block is provided with random bits from a random number generator on a substantially uniform basis, the destination location is advanced to a location in a different block (step 70). According to yet another alternative variation of the present method, the destination block is chosen so as to select a block that was least recently updated with true random bits. As will become apparent later in this disclosure, one feature of the present method is to retrieve a quantity of random bits from the buffer and to use that quantity of random bits as a basis for a new quantity of random bits. The quantity of random bits retrieved from the buffer and used as a basis for a new quantity of random bits typically includes all of the bits in a single block of the buffer. Hence, this variation of the present method provides that random bits with high entropy are placed into different (e.g. successive) blocks in the buffer. This is true even if the quantity of random bits available from a producer is not sufficient to fill an entire block. Accordingly, the random bits available from a producer are apportioned amongst different blocks in the buffer. In the event that the destination location is advanced beyond the range of the buffer (step 75), the destination location is placed to the beginning of the buffer plus an offset (step 80).

Figure 5:
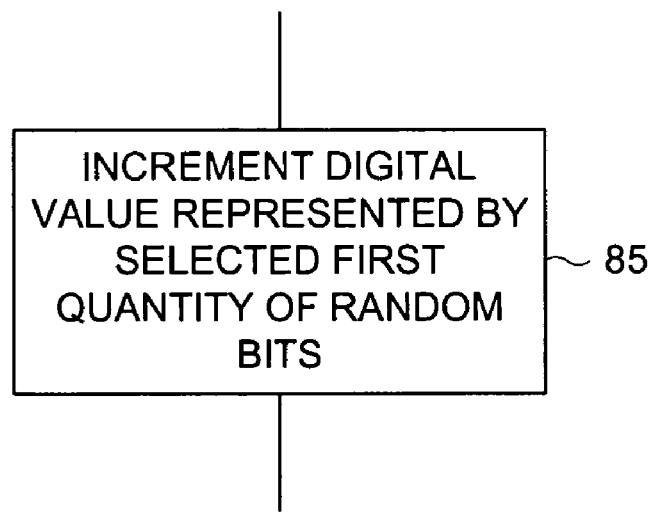
FIG. 5 is a flow diagram that depicts one alternative method for altering random bits in a buffer.

FIG. 5 is a flow diagram that depicts one alternative method for altering random bits in a buffer. According to this variation of the present method, random bits in a buffer at a source location are altered by incrementing a digital value represented by the selected first quantity of bits in the buffer (step 85).

Figure 6:
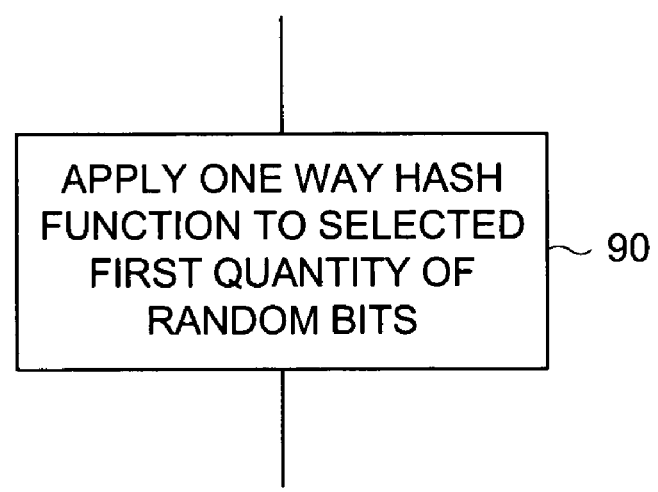
FIG. 6 is a flow diagram that depicts one alternative example method for generating a new first quantity of random bits according to a selected first quantity of random bits.

FIG. 6 is a flow diagram that depicts one alternative example method for generating a new first quantity of random bits according to a selected first quantity of random bits. According to this alternative method, a one-way hash function is applied to the first quantity of random bits (step 90). A one-way hash function is only one example of a function that may be applied to the first quantity of random bits. Hence, the scope of the appended claims is not intended to be limited to this one particular alternative example method for generating a new first quantity of random bits using a first quantity of random bits received from the buffer.

Figure 7:
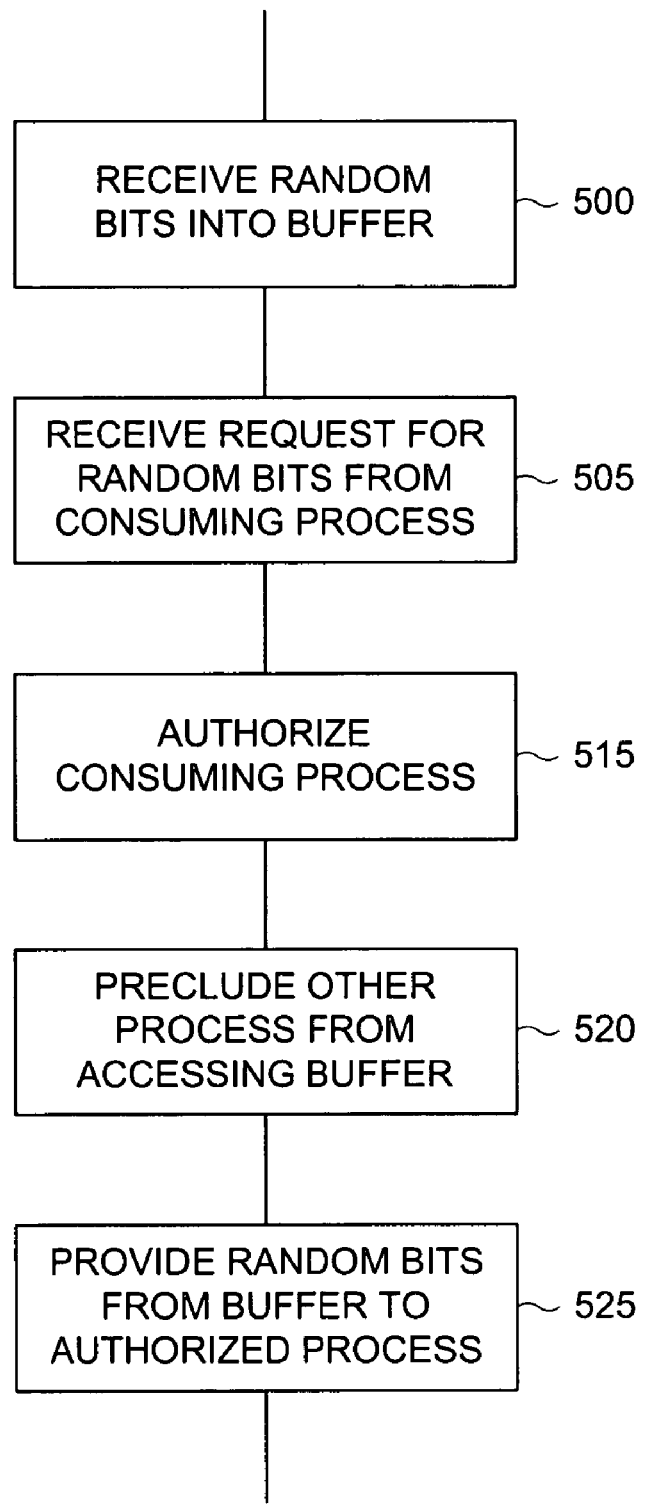
FIG. 7 is a flow diagram that depicts one alternative illustrative method for providing random bits.

FIG. 7 is a flow diagram that depicts one alternative illustrative method for providing random bits. According to this alternative method, random bits are provided by receiving random bits into a buffer (step 500). A request for random bits is then received from a consuming process (step 505). When the request is received, the consuming process is authorized to access the buffer (step 515). Other consuming processes that may attempt to access the buffer are precluded from doing so (step 520). Random bits are then provided to the authorized consuming process (step 525) from the buffer.

Figure 8:
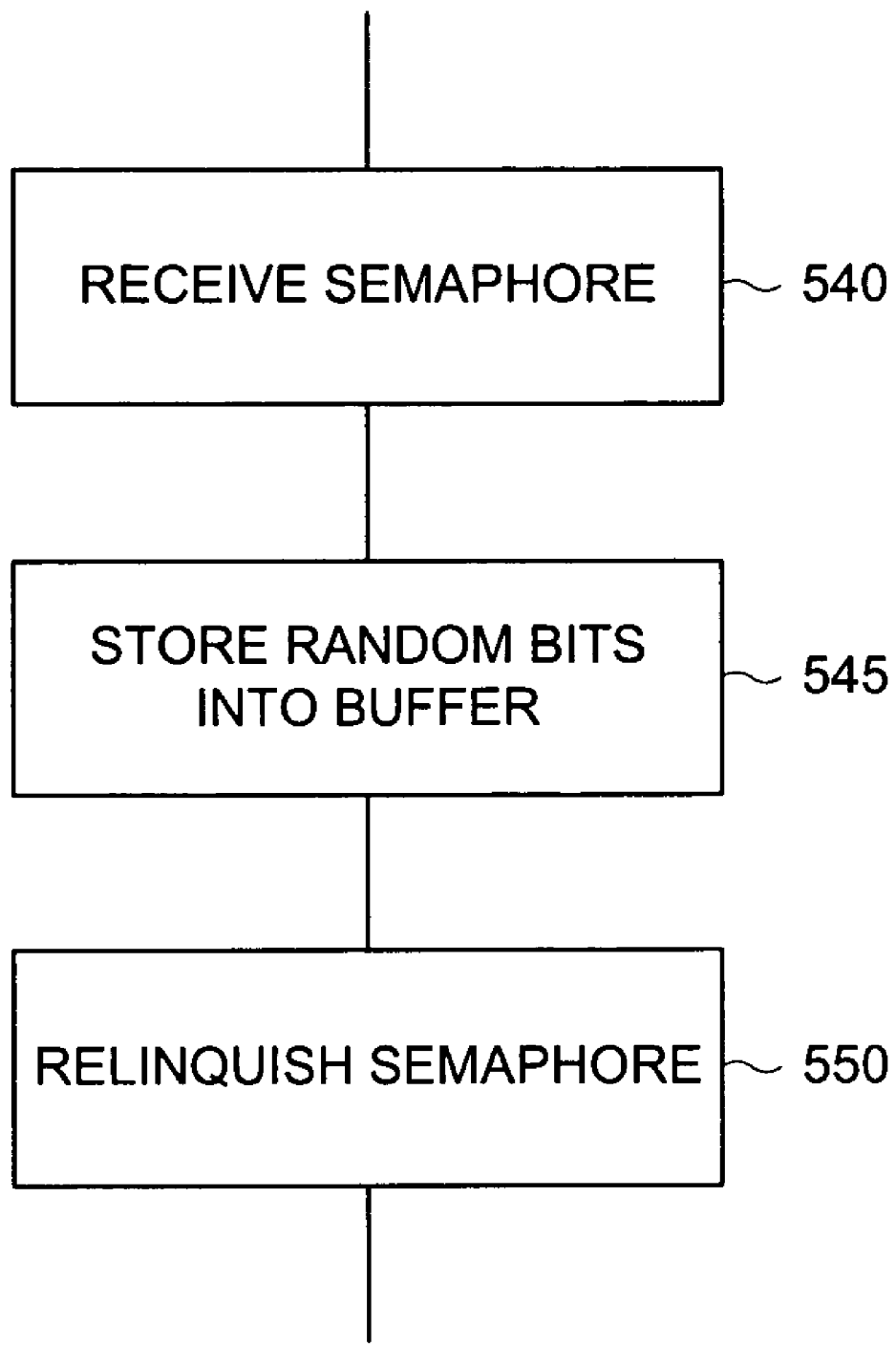
FIG. 8 is a flow diagram that depicts one alternative example method for receiving random bits into a buffer.

FIG. 8 is a flow diagram that depicts one alternative example method for receiving random bits into a buffer. According to this alternative example method, random bits are received into a buffer by first receiving a semaphore, e.g. a "write" semaphore (step 540). By requiring a process that stores random bits into a buffer to first receive a semaphore, the present method precludes simultaneous access to the buffer by a provider process and a consumer process. Once a provider process has secured a semaphore, it then stores random bits into the buffer (step 545). Once the provider has completed storage of random bits in the buffer, it relinquishes the semaphore (step 550).

Figure 9:
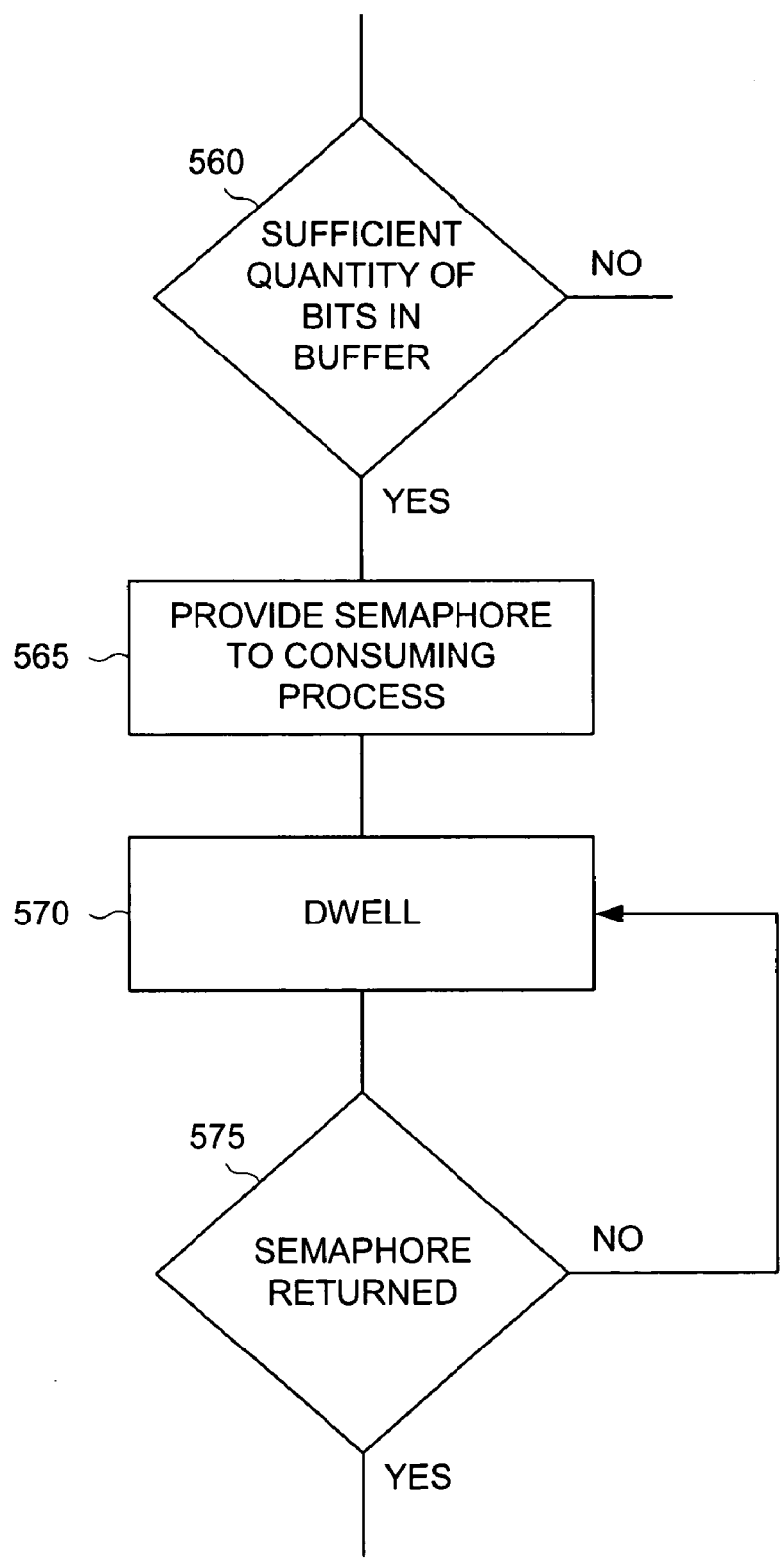
FIG. 9 is a flow diagram that depicts one alternative method for authorizing a consuming process to access a buffer having random bits stored therein.

FIG. 9 is a flow diagram that depicts one alternative method for authorizing a consuming process to access a buffer having random bits stored therein. According to this alternative method, a consuming process is authorized only when a sufficient quantity of random bits are stored in a buffer (step 560). When a sufficient quantity of random bits is stored in the buffer, a semaphore is provided to the consuming process (step 565). The consuming process is allowed to access the buffer in order to retrieve random bits there from. During this time, the authorization process dwells (step 570) until the consuming process returns the semaphore (step 575). According to one variation of this alternative method, the step of determining if a sufficient quantity of random bits is stored in the buffer is optional. Accordingly, this variation of the method comprises a step for providing a semaphore to the consuming process and then waiting until the consuming process returns the semaphore.

Figure 10:
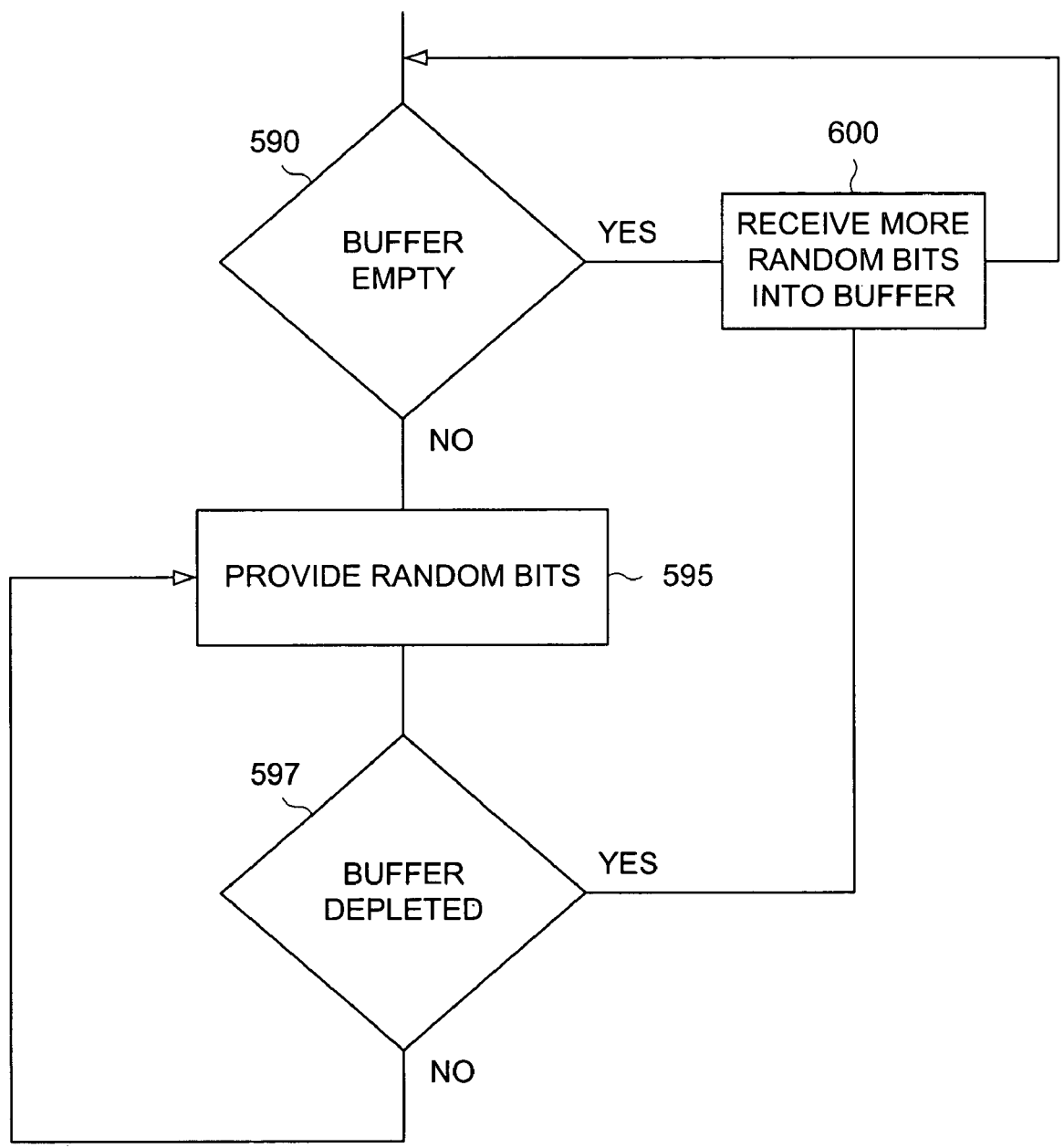
FIG. 10 is a flow diagram that depicts an alternative method for providing random bits to a consuming process from a buffer having random bits stored therein.

FIG. 10 is a flow diagram that depicts an alternative method for providing random bits to a consuming process from a buffer having random bits stored therein. According to this alternative method, the status of the buffer is first checked to ensure that it is not empty (step 590). If the buffer is not empty, random bits are provided to the consuming process (step 595). This continues until the buffer becomes depleted (step 597). In the case where the buffer becomes depleted, additional random bits are received into the buffer (step 600). It should be noted that, according to one alternative variation of the present method, random bits are received into the buffer (step 600) if the buffer was originally discovered to be empty (step 590). According to one variation of this alternative method, the buffer becomes depleted when the quantity of random bits stored therein falls below a pre-established threshold.

Figure 11:
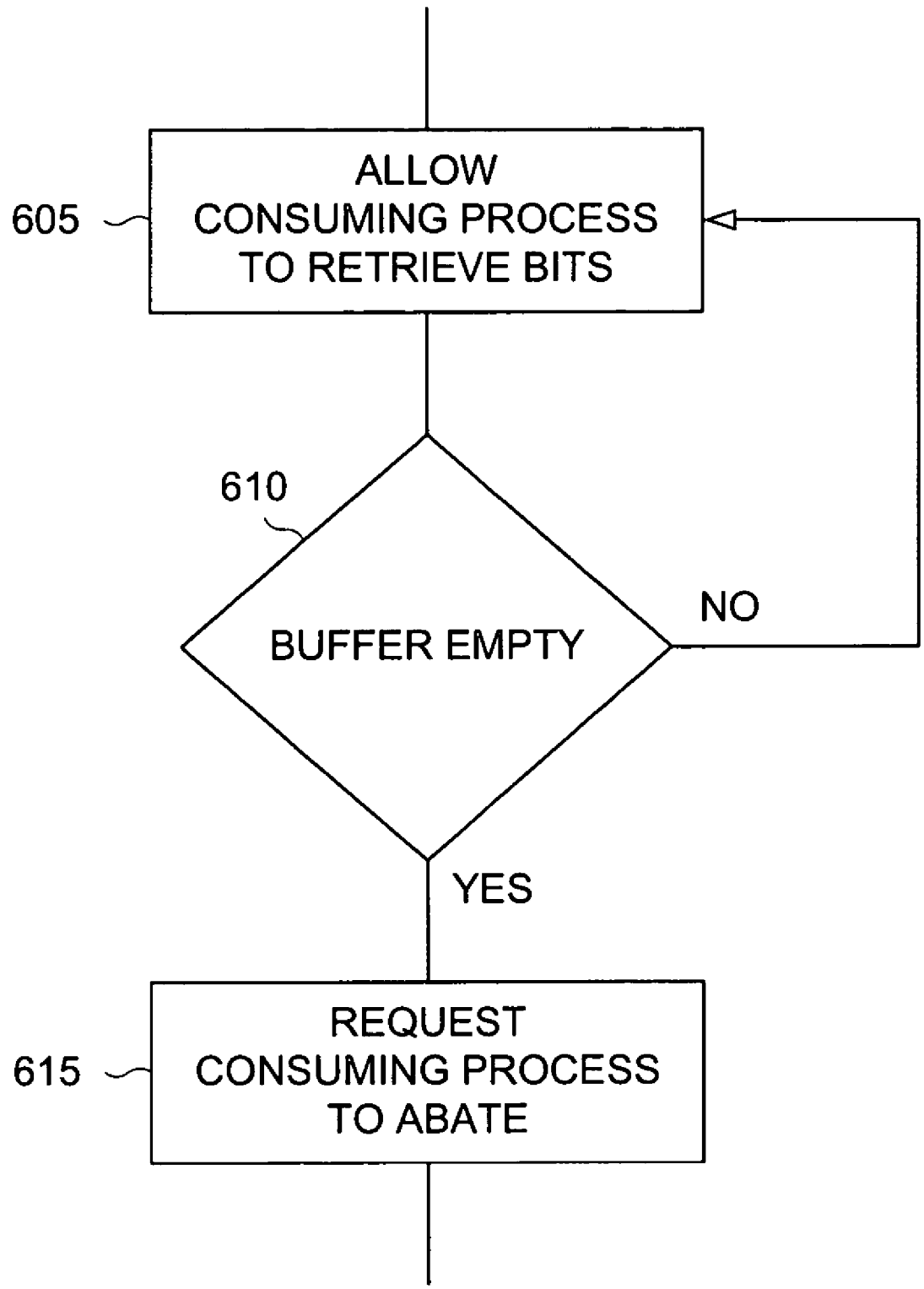
FIG. 11 is a flow diagram that depicts yet another alternative process for providing random bits to a consuming process from a buffer.

FIG. 11 is a flow diagram that depicts yet another alternative process for providing random bits to a consuming process from a buffer. According to this alternative method, random bits are provided to a consuming process by first allowing the consuming process to retrieve random bits from the buffer, e.g. by an authorization process (step 605). The consuming process is allowed to continue to retrieve random bits from the buffer until the buffer is empty (step 610). Once the buffer becomes empty, the consuming process is required to abate, e.g. by relinquishing a semaphore (step 615).

Figure 12:
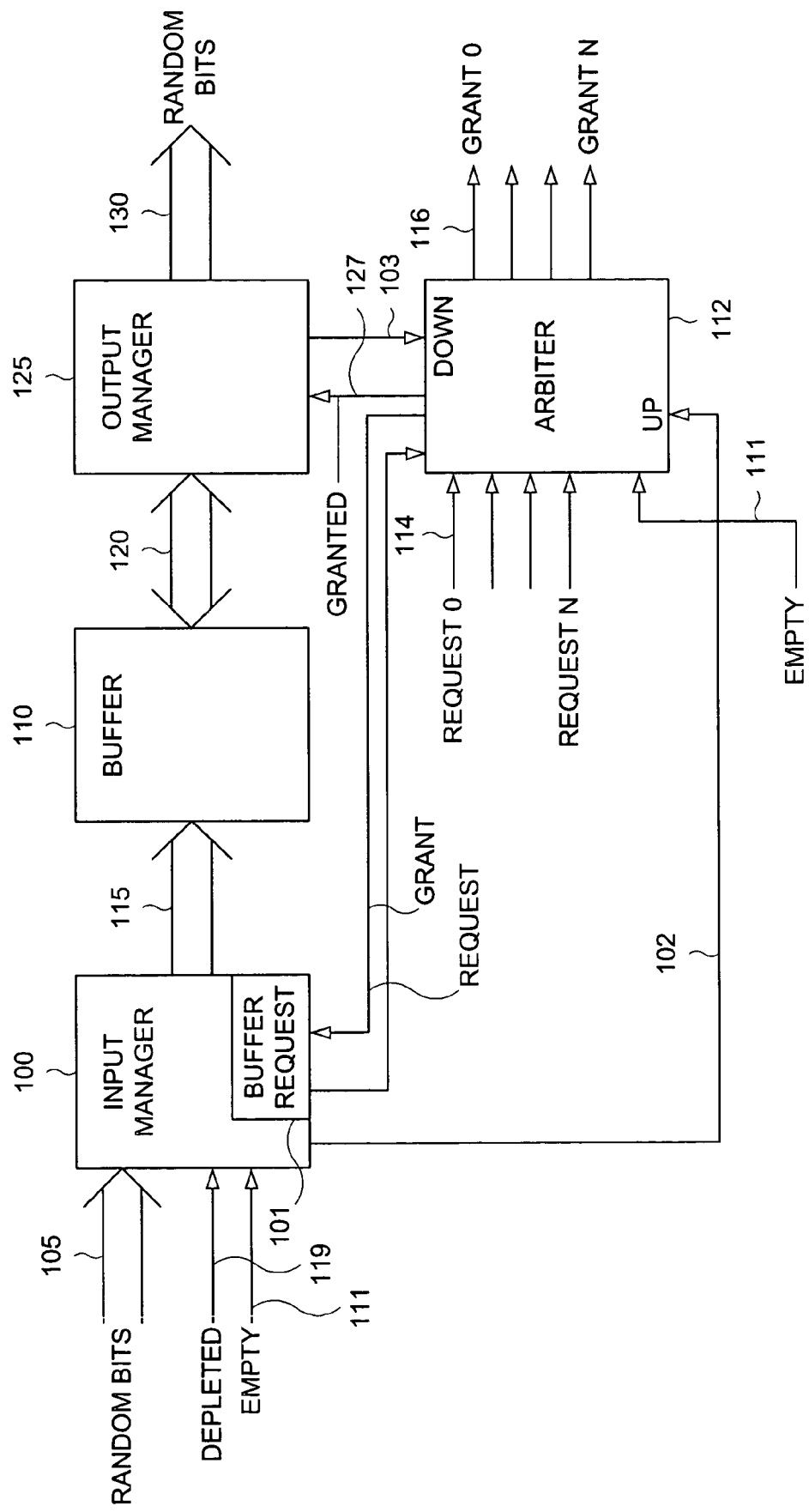
FIG. 12 is a block diagram of one example embodiment of an apparatus for providing random bits.

FIG. 12 is a block diagram of one example embodiment of an apparatus for providing random bits. According to this example embodiment, an apparatus for providing random bits comprises a buffer 110, an input manager 100 and an output manager 125. According to this example embodiment, the input manager 100 is capable of receiving random bits 105 and storing the random bits in the buffer 110. The output manager 125 is capable of retrieving a quantity of random bits from the buffer 110 at a source location. The retrieved quantity of random bits is altered by the output manager 125 and returned to the source location in the buffer 110. The retrieved quantity of random bits retrieved from the buffer 110 by the output manager 125 is used as a basis for generating a new first quantity of bits. The output manager 125 is further capable of advancing the source location to the next location in the buffer 110. In the event that the next source location is beyond the range of the buffer 110, the output manager 125 places the source location at the beginning of the buffer 110 plus an offset.

Figure 13:
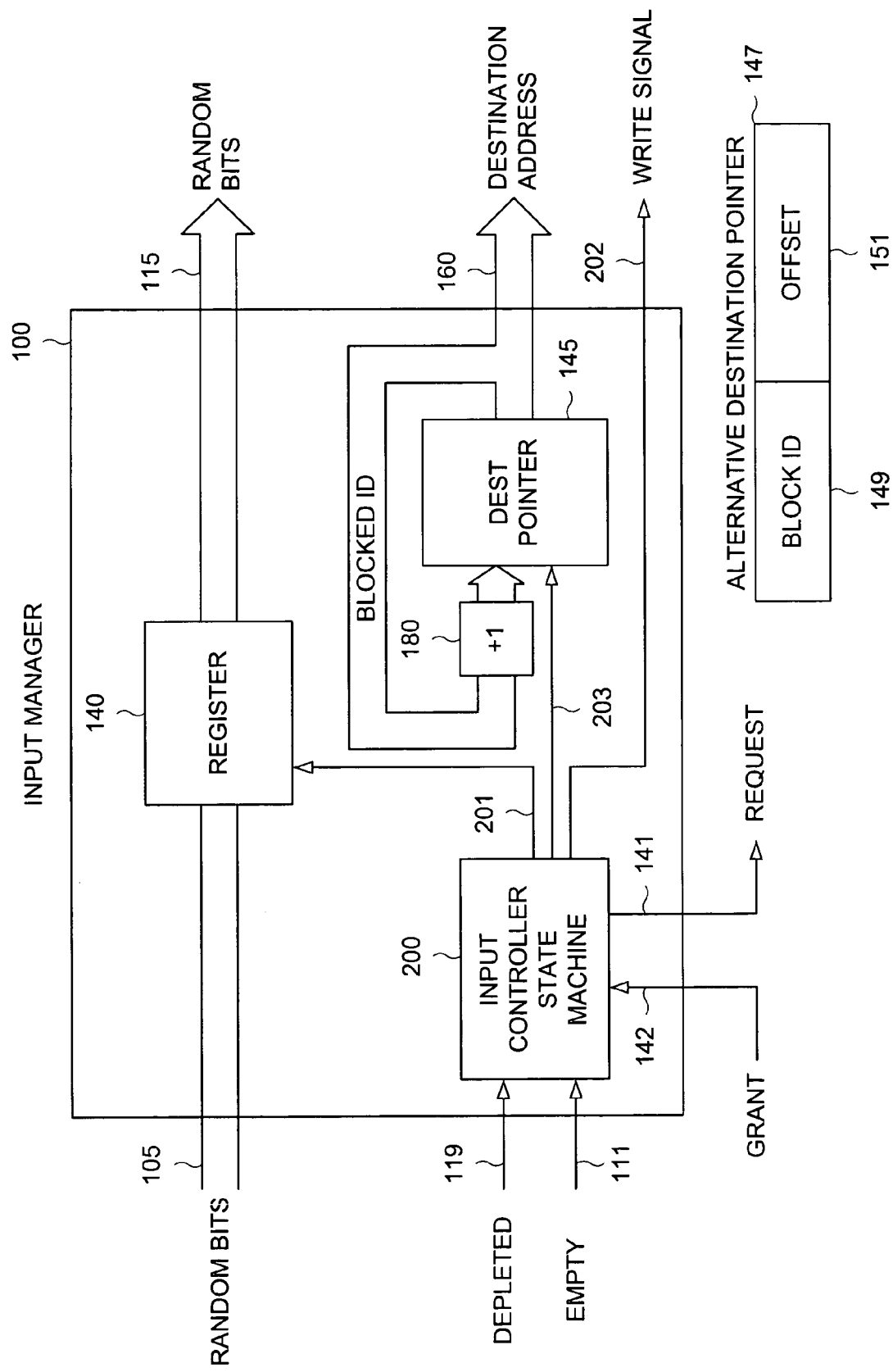
FIG. 13 is a block diagram of one alternative embodiment of an input manager.

FIG. 13 is a block diagram of one alternative embodiment of an input manager. According to this alternative embodiment, an input manager 100 comprises an input register 140, a destination pointer 145, an incrementation unit 180 and an input controller 200. According to this alternative embodiment, the input controller 200 loads random bits 105 into the input register 140. According to one illustrative embodiment, the input controller 200 comprises a state machine that generates a load signal 201 that controls storage of random bits 105 into the input register 140. The input controller 200 further includes a capability for generating a write signal 202 when the input register 140 is holding random bits. This write signal 202 may be used as an indicator that valid random bits 115 are available at the output of the input manager 100. Once the write signal 202 is deasserted, the input controller 200 increments the destination pointer 145. Typically, the destination pointer 145 generates a destination address 160 that may be used to direct random bits 115 from the input manager 100 to a specific location in the buffer 110. In order to increment the destination pointer 145, this alternative embodiment of an input manager relies on the incrementation unit 180 to increment the current value (i.e. the destination address 160) stored in the destination pointer 145. The output of the incrementation unit 180 is loaded into the destination pointer 145 by an increment control signal 203. The increment control signal 203 is generated by the input controller 200 once the write signal 202 is deasserted. The input controller 200, according to one alternative embodiment, comprises a state machine that orchestrates the loading of random bits 105 into the input register 145, the assertion of the write signal 202 and the incrementation of the destination pointer 145.

FIG. 13 further illustrates that one alternative embodiment of an input manager 100 comprises a destination pointer 147 that includes a block identification field 149 and an offset field 151. According to this alternative embodiment, the incrementation unit 180 operates on the block identification field 149. By so doing, random bits 105 are apportioned amongst blocks included in the buffer 110 wherein the buffer 110 is organized into blocks. It should be noted that in each case, incrementation of the destination pointer 145 operates on a fixed number of address bits to form a destination address 160. Generally, the incrementation will "roll-over" to the beginning of the buffer 110 when the destination pointer 145 is pointing to the last location in the buffer 110.

Figure 13A:
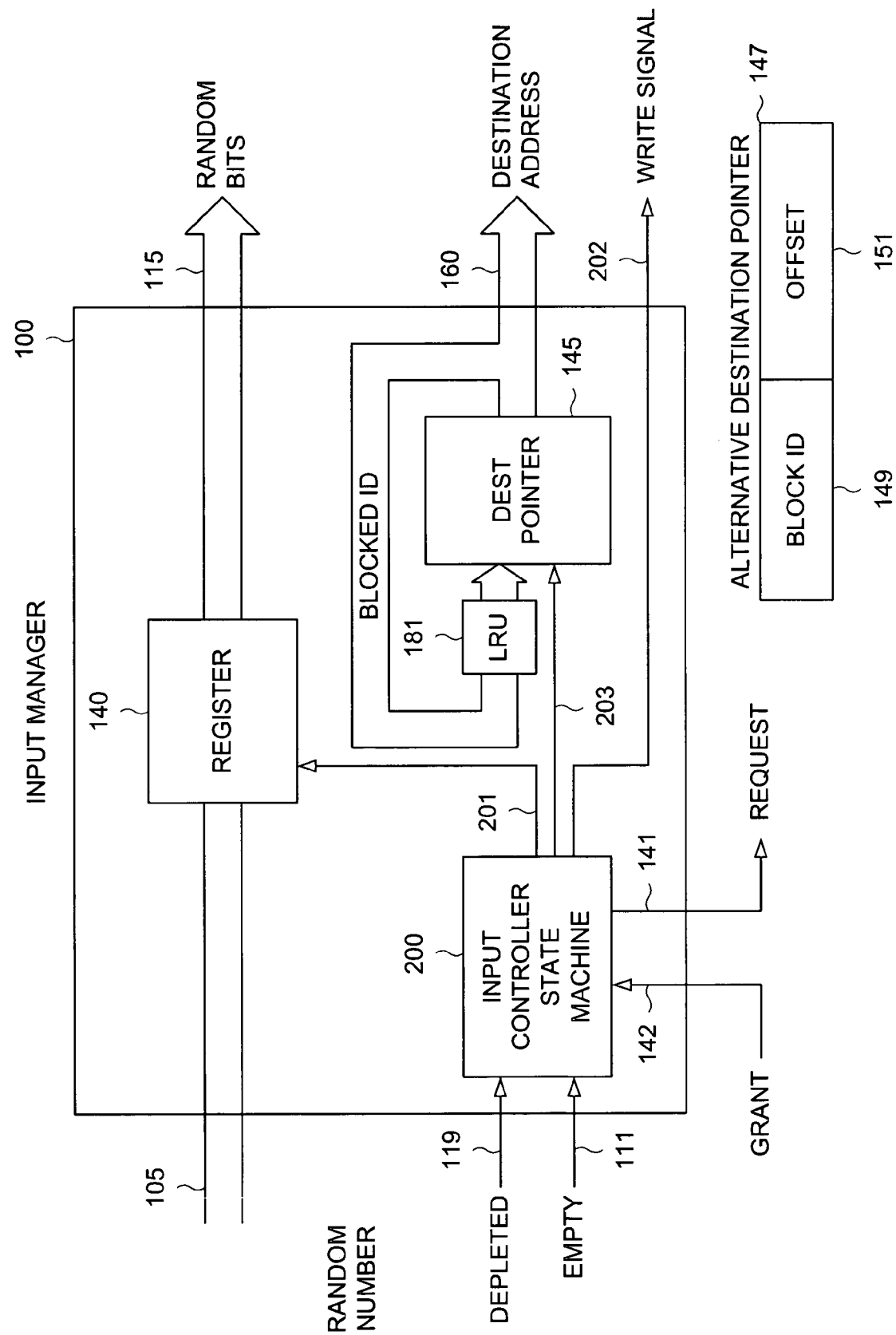
FIG. 13A is a block diagram of yet another alternative embodiment of an input manager.

FIG. 13A is a block diagram of yet another alternative embodiment of an input manager. According to this alternative embodiment, the incrementation unit 180 is replaced by a least recently updated selector 181. Accordingly, the least recently updated (LRU) selector 181 maintains a history of which block was least recently updated using the block identifier (ID) portion of the destination address 160. The LRU selector 181 selects a next block ID 149 according to this history.

Figure 14:
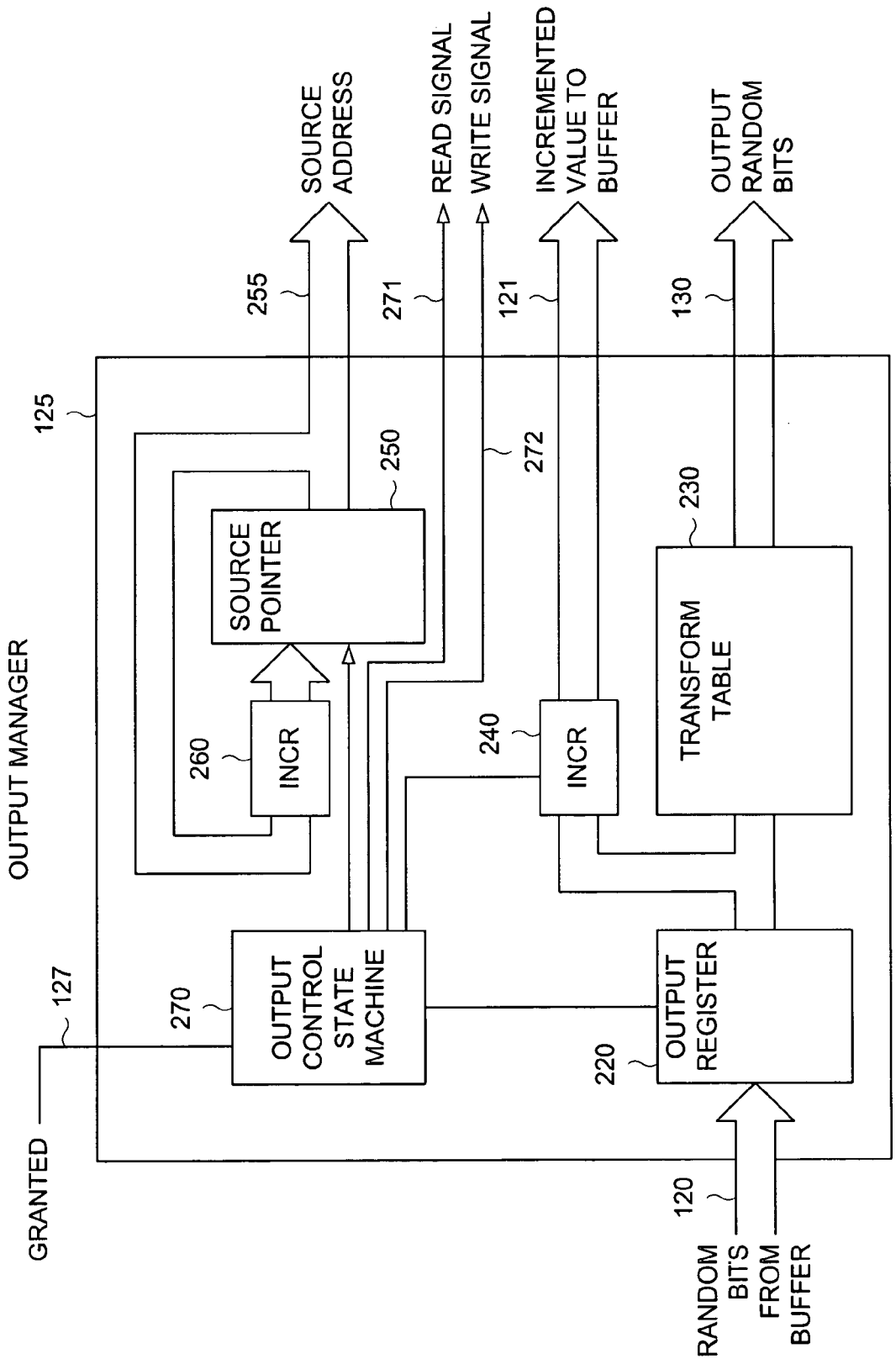
FIG. 14 is a block diagram that illustrates the structure of one alternative embodiment of an output manager.

FIG. 14 is a block diagram that illustrates the structure of one alternative embodiment of an output manager. According to this alternative embodiment, an output manager 125 comprises an output register 220, a value incrementation unit 240 and an output controller 270. According to yet another alternative embodiment, the output controller 270 comprises a state machine that generates control signals for choreographing the flow of data as further described infra. The output manager 125, according to one alternative embodiment, further comprises a source pointer 250 and a source address incrementer 260.

According to one alternative embodiment, the output controller 270 generates a read signal 271. The read signal 271 operates to retrieve random bits 120 from the buffer 110 from a particular source location as dictated by a source address 255 maintained by the source pointer 250. Once a quantity of bits 120 is retrieved from the buffer 110, the value represented by those bits is stored in the output register 220, the output controller 270 causes the output register 220 to direct the value to the incrementation unit 240. The incrementation unit 240 increments the value it receives from the output register and directs an incremented value as altered random bits 121 back to the buffer 110. When the incremented value is available at the buffer 110, the output controller 270 generates a write signal 272 that may be used to store the incremented value back into the buffer 110. It should be noted that the source address 255 dictates the location at which the incremented value is rewritten back into the buffer 110.

According to one alternative embodiment, the value stored in the output register 220 is transformed into output random bits 130. Accordingly, this alternative embodiment further comprises a transformation table 230. The transformation table 230 generates a new quantity of random bits 130 based on the value received from the output register 220. The transformation table 230, according to one alternative embodiment, has stored therein a one-way hash function. Hence, the value received from the output register 220 is used to select a particular location in the transformation table 230. That particular location is used to store the output value according to a particular transformation function stored in the table (e.g. a one-way hash function). It should be noted that the transformation table may be used to store any suitable transformation function and the scope of the appended claims is not intended to be limited to any particular transformation function herein described (e.g. a one-way hash function).

Once the altered random bits are stores in the buffer 110, the output controller 270, according to one alternative embodiment, generates a source address update signal. The source update signal causes the source pointer 250 to store the next source location from the source address incrementer 260. It should be noted that the source address incrementer 260 receives the current value in the source pointer 250 and selects a next source address. According to one alternative embodiment, the source address incrementer 260 operates on a block ID portion of the source address 255 stored in the source pointer 250.

FIG. 12 further depicts that one alternative embodiment of an apparatus for providing random bits further comprises an arbiter 112. According to this alternative embodiment, the arbiter 112 is capable of receiving a plurality of requests 114 for random bits from a plurality of consumers of such random bits. The arbiter 112, upon receiving an asserted request signal, responds to a consumer for random bits by issuing a grant signal 116. The arbiter 112 then signals the output manager 125 that the output manager 125 should provide random bits 130 to the consumer that was issued a grant signal 116.

FIG. 13 further depicts that one alternative embodiment of an input manager 100 is further capable of issuing a request signal 141 when the input manager 100 needs to store random bits in the buffer. According to one alternative embodiment, the input manager comprises a buffer request unit 101 (as shown in FIG. 12). It should be noted that according to one alternative embodiment, the buffer request unit 101 is embodied in a state machine that constitutes the input controller 200 included in the input manager 100. Hence, the input controller 200 of this alternative embodiment will refrain from accessing the buffer 110 until it receives a grant signal 142 from the arbiter 112. According to one alternative embodiment, the input manager 100 will store additional random bits into the buffer 110 when the buffer is empty, as indicated by an "empty" signal 111. For example, the buffer 110 may become depleted if it no longer contains random bits (i.e. it is empty). According to one alternative embodiment, the input manager 100 will store additional random bits into the buffer 110 when the buffer becomes depleted, as indicated by a "depleted" signal 119. The buffer 110 may become depleted for wide variety of reasons. In another example, the buffer 110 may become depleted if the number of random bits falls below a low water mark (a pre-established threshold 117, infra).

Figure 15:
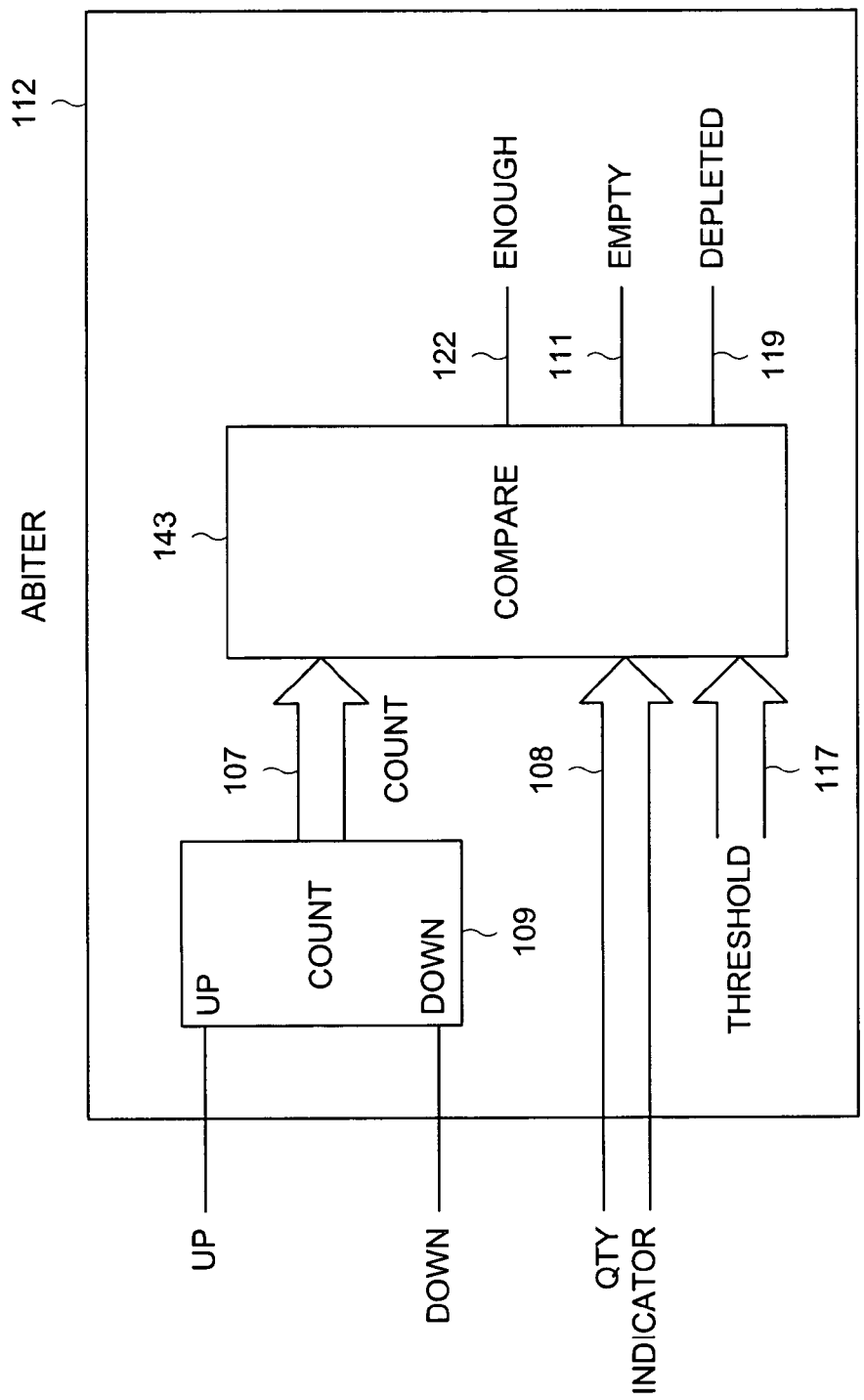
FIG. 15 is a block diagram of one alternative embodiment of an arbiter.

FIG. 15 is a block diagram of one alternative embodiment of an arbiter. According to this alternative embodiment, an arbiter 112 includes a counter 109. The counter 109 receives an UP signal 102 and a DOWN signal 103. The UP signal 102 is received from the input manager 100, which according to one alternative embodiment of the input manager 100 asserts the UP signal in accordance with placing random bits 115 in the buffer 110. The DOWN signal 103 is received from the output manager 125. According to one alternative embodiment of the output manager 125, the output manager 125 asserts the DOWN signal 103 commensurate with the retrieval of random bits 120 from the buffer 110. Accordingly, the counter 109 reflects an accurate count 107 of the quantity of random bits available in the buffer 110.

According to one alternative embodiment of the arbiter 112, the arbiter 112 is capable of receiving a request from a consumer that includes a demand quantity indicator 108. The arbiter 112 of this alternative embodiment further includes a comparator 143. The comparator 143 compares the count indicator 107 that is indicative of the quantity of random bits available in the buffer 110 to the quantity indicator 108 received from a consumer of random bits. If there are enough bits available in the buffer 110, the comparator generates a signal called "enough" 122. When the "enough" signal is active and a request is pending, the arbiter 112 issues a grant signal 116 to the consumer. According to yet another alternative embodiment, the arbiter 112 is capable of deasserting any active grant signal 116 when the buffer 110 is empty. According to this alternative embodiment of the arbiter 112, the comparator 143 generates an empty signal 111 when the counter 109 indicates that the buffer 110 is empty. This signal is used by the arbitration process in order to deassert any active grant signal, as described supra. According to yet another embodiment, the comparator 143 generates a depleted signal 119 when the count 107 indicative of the quantity of random bits in the buffer 110 falls below a pre-established threshold 117.

According to yet another alternative embodiment of the arbiter 112, the grant signal that is issued in response to a request 114 is maintained so long as the corresponding request signal 114 remains active. In this case, the consumer of random bits is allowed to retrieve random bits so long as it continues to require random bits. These examples are presented here to illustrate the operation of the arbiter and are not intended to limit the scope of the appended claims. In any case and irrespective of how the buffer 110 enters a state of depletion, the input manager 100, by way of the buffer request unit 101, requests access to the buffer 110 from the arbiter 112. In order to ensure that additional random bits are added to the buffer 110, the arbiter 112 is capable of deasserting any grant signal 116 in deference to a request issued by the input manager 100.

FIG. 14 further illustrates that, according to yet another embodiment of an output manager, the output controller 270 accesses the buffer when it receives a "granted" signal 127 from the arbiter 112. Accordingly, access to the buffer by the output manager is regulated by the arbiter 127. Hence, when the input manager 100 needs to replenish the buffer 110, it requests access to the buffer 110 using the request signal 141 it generates (from the input controller 200).

Figure 16:
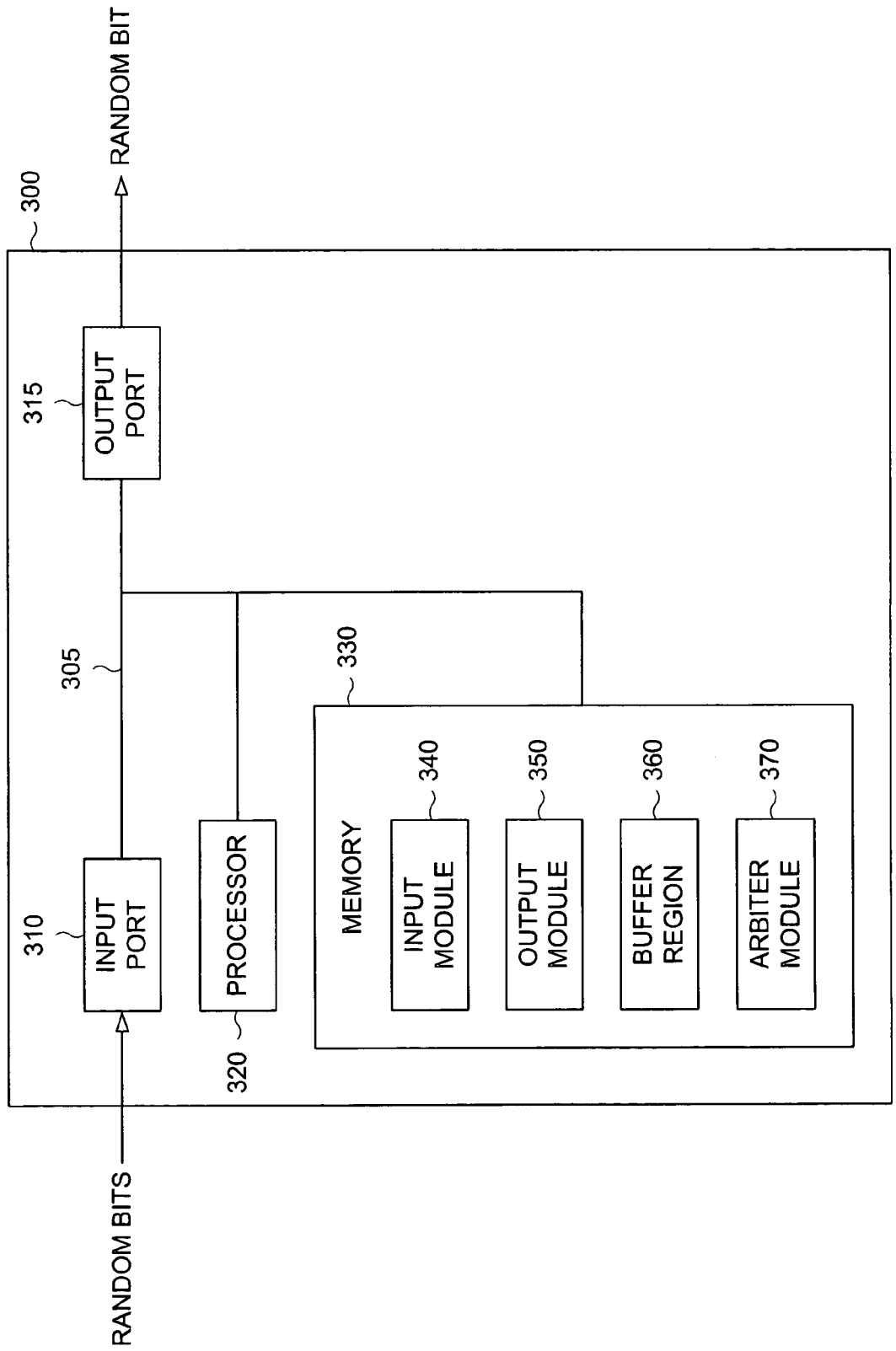
FIG. 16 is a block diagram that depicts one alternative example embodiment of an apparatus for providing random bits.

FIG. 16 is a block diagram that depicts one alternative example embodiment of an apparatus for providing random bits. According to this alternative example embodiment, an apparatus for providing random bits comprises one or more processors 320 and a memory 330. According to yet another alternative embodiment, the apparatus further comprises an input port 310 and an output port 315. These elements are connected to each other by an internal data bus 305, also included in the apparatus of the present embodiment. According to one alternative embodiment, a portion of the memory 330 is set aside as a buffer region 360, which is used to store random bits according to the teaching described infra. This alterative example embodiment further comprises various functional modules each of which comprises an instruction sequence that can be executed by the one or more processors 320. For purposes of this disclosure, a functional module and its corresponding instruction sequence is referred to by a process name. The instruction sequence that implements the process, according to one alternative embodiment, is stored in the memory 330. The reader is advised that the term "minimally causes the processor" and variants thereof is intended to serve as an open-ended enumeration of functions performed by the processor as it executes a particular functional process (i.e. instruction sequence). As such, an embodiment where a particular functional process causes the processor to perform functions in addition to those defined in the appended claims is to be included in the scope of the claims appended hereto.

According to one example embodiment of an apparatus for providing random bits, instruction sequences that implement functional modules are stored in the memory 330 including an input module 340 and an output module 350. According to one alternative embodiment, an additional instruction sequence that implements an arbiter module 370 is also included in the memory 330.

The functional processes (and their corresponding instruction sequences) described thus far that enable the provision of random bits are, according to one alternative embodiment, imparted onto computer readable medium. Examples of such medium include, but are not limited to, random access memory, read-only memory (ROM), CD ROM, floppy disks, and magnetic tape. This computer readable medium, which alone or in combination can constitute a stand-alone product, can be used to convert a general-purpose computing platform into a device for providing random bits according to the techniques and teachings presented herein. Accordingly, the claims appended hereto are to include such computer readable medium imparted with such instruction sequences that enable execution of the present method and all of the teachings afore described.

Figure 17:
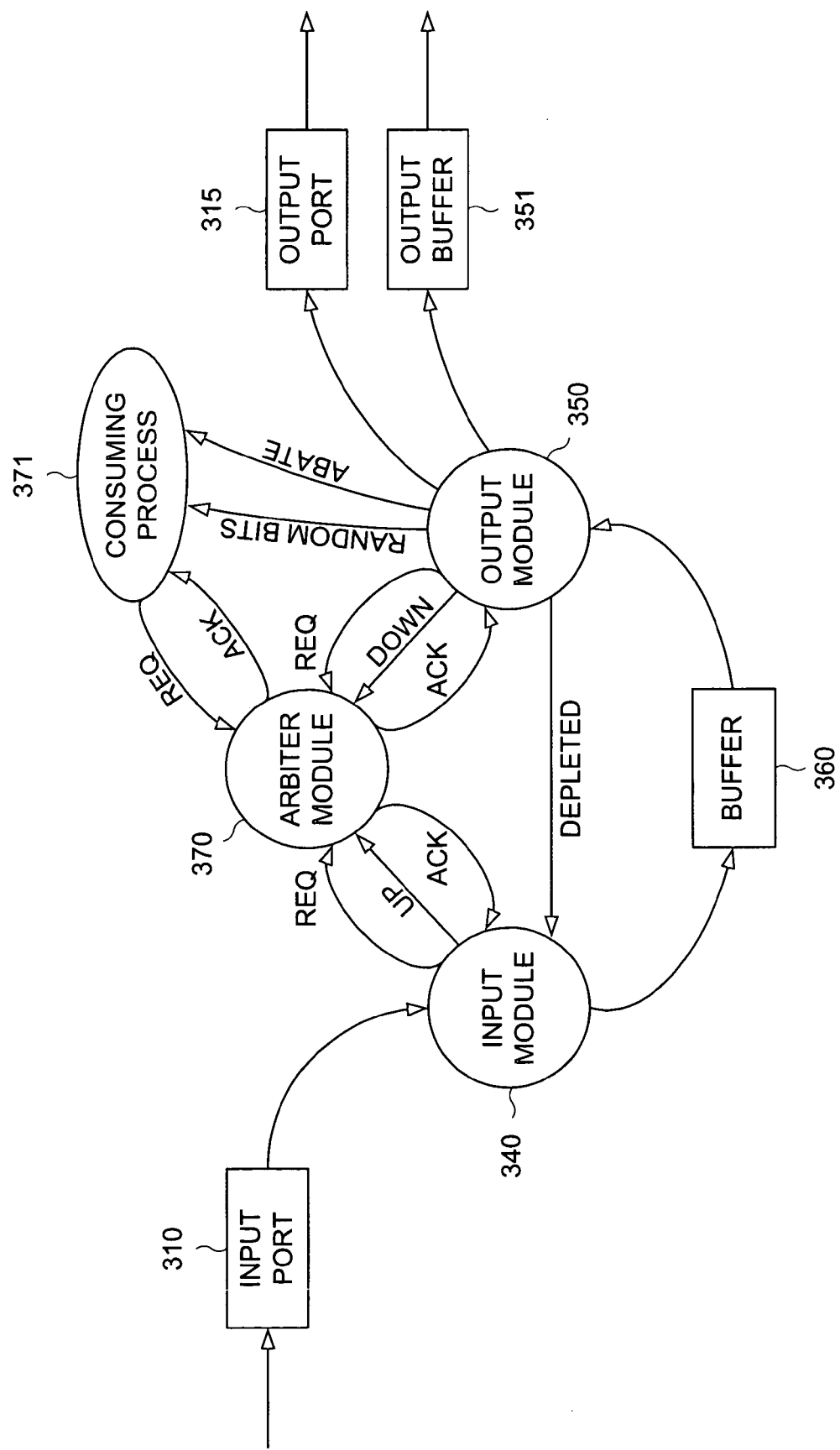
FIG. 17 is a data flow diagram that depicts the interaction of various elements included in one alternative embodiment of an apparatus for providing random bits.

FIG. 17 is a data flow diagram that depicts the interaction of various elements included in one alternative embodiment of an apparatus for providing random bits. According to one alternative embodiment, random bits arrive at the input port 310. The input port, according to one alternative embodiment, comprises a register for accessing data from at least one of a real time clock, an interrupt counter and a thermal noise device. A process, which is embodied as an instruction sequence, is executed by the processor 320, said process being the input process 340. The input process 340, when executed by the processor 320, minimally causes the processor 320 to retrieve one or more random bits from the input port 310. Accordingly, the input module 340, when executed by the processor 320, minimally causes the processor 320 to store a succession of random bits in the buffer region 360 in the memory 330. According to this alternative embodiment, the output module, when executed by the processor 320, minimally causes the processor 320 to select a first quantity of random bits from the buffer region 360 from a particular source location. The source location, according to one alternative embodiment, is managed by means of a pointer (or index) into a table. The output module 350 further minimally causes the processor 320 to alter the random bits at the source location and to generate a new quantity of random bits based on the original random bits retrieved from the source location. Once this is accomplished, the processor 320, by continued execution of the output module 350, advances the source location (e.g. by incrementing a pointer or table index). In the event that the new source location is found to be beyond the range of the buffer region 360, then the new source location is set to the beginning of the buffer region 360 plus an offset. Hence, the output module 350, according to one alternative embodiment, minimally causes the processor 320 to perform a modulus arithmetic function on the size of the buffer region 360 and the next source location to determine such offset when a wrap of the buffer region 360 is required.

The processor 320, by further execution of the output module 350 further minimally is caused to generate a new quantity of random bits based in the selected first quantity of random bits. Accordingly, the processor 320 further minimally is caused to forward the newly generated bits to the output port 315. According to one alternative embodiment, the output module 350 merely places the newly created random bits in an output buffer 351.

Figure 18:
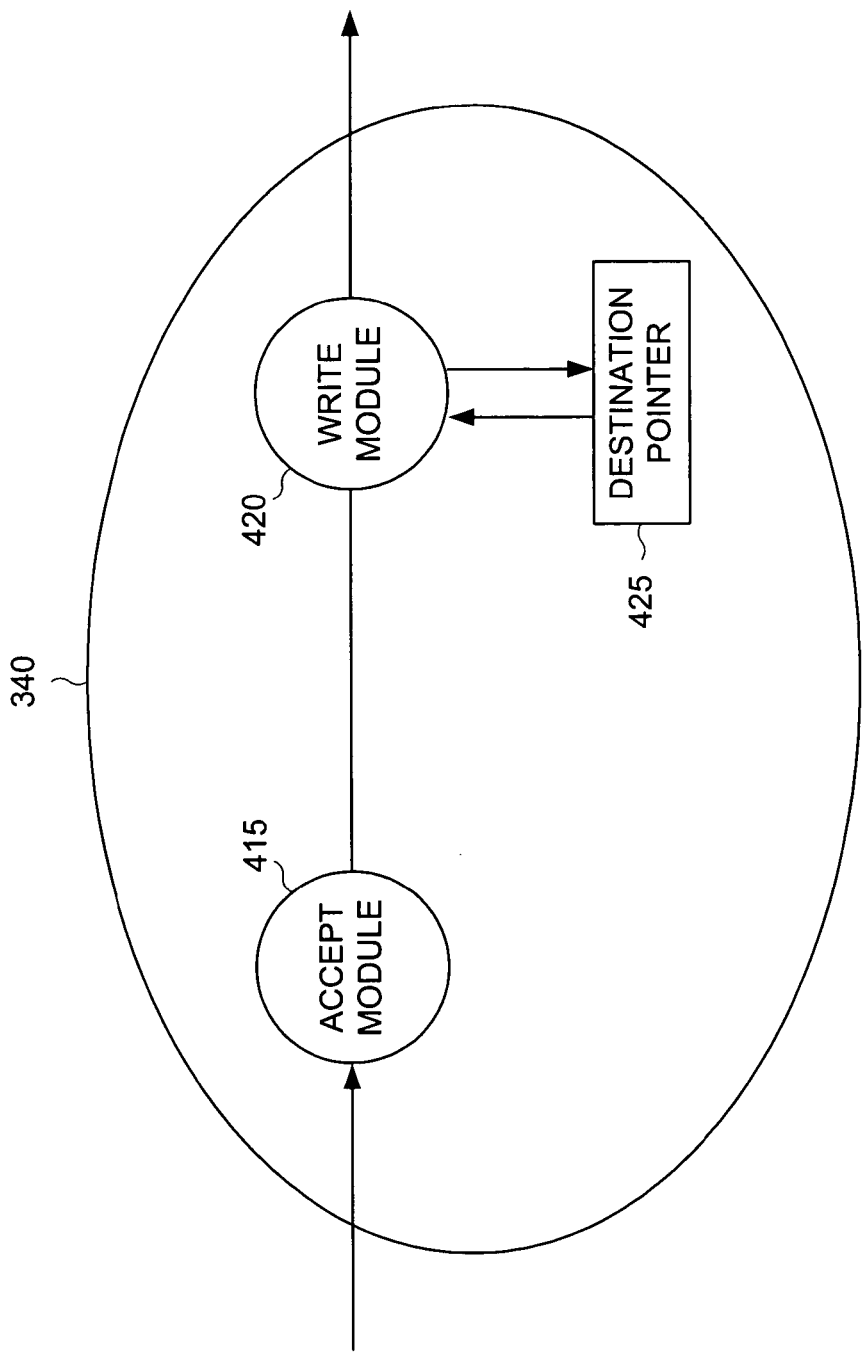
FIG. 18 is a data flow diagram that depicts the operation of one example embodiment of an input module.

FIG. 18 is a data flow diagram that depicts the operation of one example embodiment of an input module. According to one alternative embodiment, an input module includes a write module 420 that, when executed by the processor 320, minimally causes the processor 320 to store a second quantity of random bits in the buffer region 360. According to this alternative embodiment, the buffer region 360 is accessed by means of a destination pointer 425. Once the quantity of random bits is stored in the buffer region 360, the destination pointer is advanced to the next location in the buffer region 360. In the event that the destination pointer 425 is advanced beyond the extent of the buffer region 360, the destination pointer 425 is set to the beginning of the buffer region 360 plus an offset. The write module 420 minimally causes the processor 320 to determine the offset through a modulus arithmetic operation performed on the size of the buffer region 360 and the next advanced destination address stored in the destination pointer 425. According to yet another embodiment, the input module 340 includes an accept module 415. The accept module 415 serves as an intermediate elasticity buffer (e.g. a first-in-first-out buffer) between a source of random bits and the write module 420.

According to one alternative embodiment of a write module 420, the write module 420 causes the processor 320 to organize the buffer region 360 into blocks. After the buffer region 360 is organized into blocks, the processor 320 stores a second quantity of random bits into the buffer region 360 at a destination location and then advances the destination location to the next location in a different block in the buffer region 360. When the next destination location in a different block is beyond the range of the buffer region 360, continued execution of the write module 420 further minimally causes the processor 320 to place the destination address to the beginning of the buffer region 360 plus an offset. According to yet another embodiment of an write module 420, the write module 420, when executed by the processor 320 further minimally causes the processor 320 to advance the destination address to a different block according to a least recently updated block. Hence, as random bits are received by the input module 340, they are apportioned amongst blocks in the buffer region 360 on a substantially uniform basis.

Figure 19:
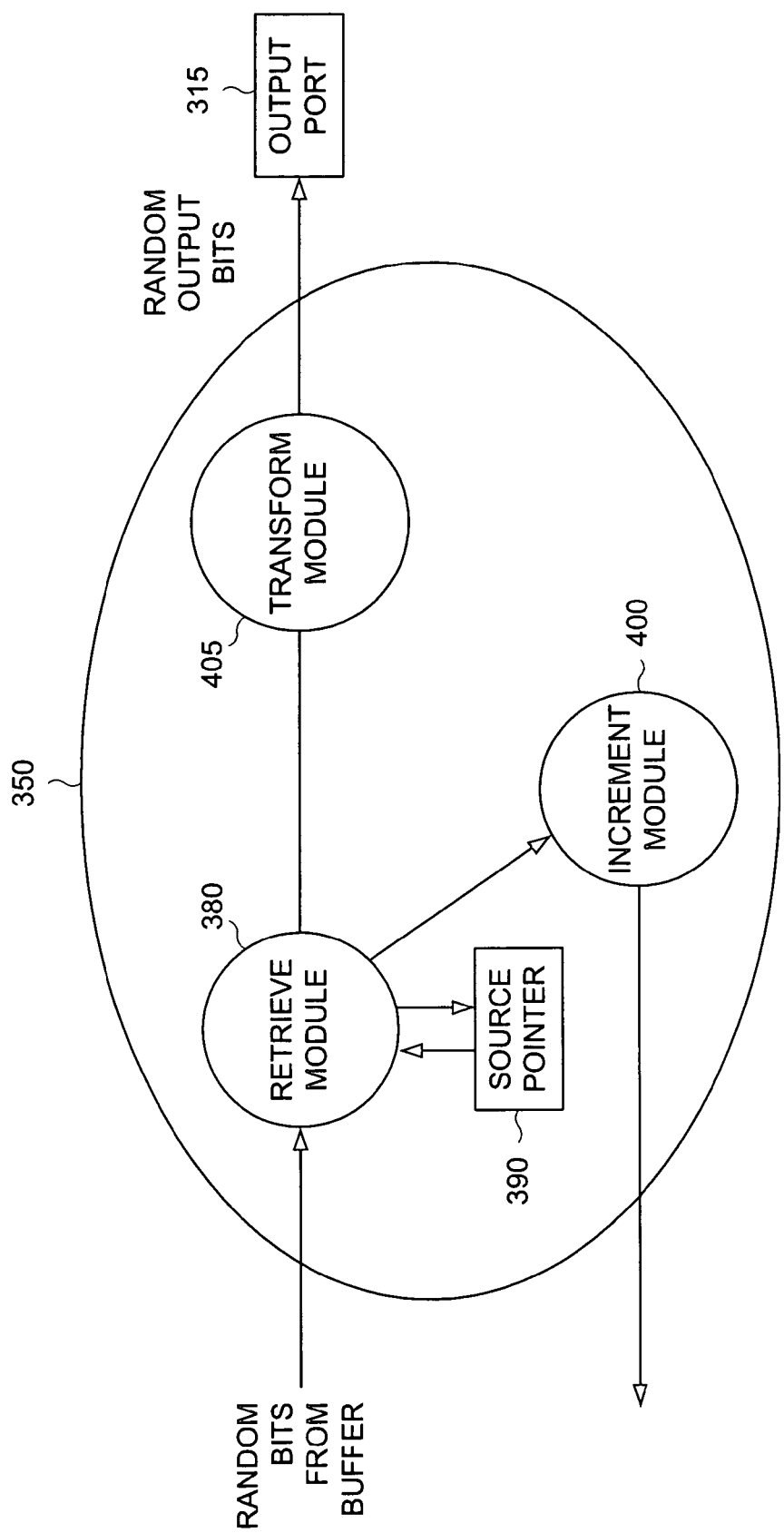
FIG. 19 is a data flow diagram that depicts the operation of one alternative embodiment of an output module.

FIG. 19 is a data flow diagram that depicts the operation of one alternative embodiment of an output module. According to one alternative embodiment, the output module 350 includes a retrieve module 380. According to this alternative embodiment, the processor 320 minimally manages a source pointer 390 that indicates the source location from which random bits are to be retrieved from the buffer region 360. According to this alternative embodiment, the retrieve module 380 further causes the processor 320 to minimally retrieve random bits from the buffer region 360 according to the source pointer 390. As the processor 320 retrieves random bits, it conveys the random bits to a transformation module 405. The transformation module 405 is included in one alternative example embodiment of an output module 350. The transformation module 405, when executed by the processor 320, further minimally causes the processor 320 to generate a new quantity of random numbers by application of a one-way hash function to random bits received from the retrieve module 380.

Also included in yet another alternative embodiment of an output module 350 is an increment module 400. The processor 320, as it continues to execute the retrieve module 380, further minimally conveys the retrieved random bits and an indication of their source location to the increment module 400. The increment module 400 further minimally causes the processor 320 to increment a value represented by random bits received from the retrieve module 380 and the to store the incremented value back into the buffer region 360 according to the indicated source address it also received from the retrieve module 380.

FIG. 17 also illustrates the operation of yet another alternative example embodiment of a bit provisioning unit. This alternative embodiment, as already described, further comprises an arbiter module 370 that is stored in the memory 330. The arbiter module 370, when executed by the processor 320, minimally causes the processor 320 to authorize one consuming process 371. The input module 340 of this alternative embodiment minimally causes the processor 320 to receive random bits from the input port 310 and to store these in the buffer region 360 included in the memory 330. The output module 350 of this alternative example embodiment, when executed by the processor 320, minimally causes the processor to provide random bits to an authorized consuming process 371 while precluding non-authorized consuming processes from accessing the buffer region 360.

According to one alternative illustrative embodiment, the input module 340 minimally causes the processor 320 to store random bits in the buffer 360 by minimally causing the processor 320 to receive a semaphore and then store random bits in the buffer region 360. Accordingly, once the processor 320 is finished storing random bits in the buffer region 360, it relinquishes the semaphore. This semaphore transaction processing may be visualized as a request and acknowledge sequence, as illustrated in the figure.

According to yet another alternative example embodiment, the arbiter module 370 minimally causes the processor to authorize one consuming process by minimally causing the processor 320 to receive a request for random bits that includes a quantity indicator. The arbiter module 370 of this alternative embodiment receives signals from the input module 340 and the output module 350. As the arbiter module 370 is executed by the processor 320, the processor 320 minimally tracks the quantity of random bits available in the buffer 360 by increasing a counter or decreasing the counter according to the signals received from the input module 340 and the output module 350. Accordingly, the input module 340, when executed by the processor 320, minimally causes the processor to generate a signal called "UP" which indicates the quantity of random bits placed into the buffer 360. Likewise, the output module 350, when executed by the processor 320, minimally causes the processor to generate a signal called "DOWN", which indicates the quantity of random bits retrieved from the buffer 360. According to this alternative embodiment of an arbiter module 370, the arbiter module 370, when executed by the processor 320, minimally causes the processor to issue a semaphore to the consuming process 371 when a sufficient quantity of random bits is available in the buffer region 360. Accordingly, the arbiter module 370 minimally causes the processor to compare the quantity indicator included in the request for random bits received from the consuming process 371 to the quantity of random bits available in the buffer 360 as tracked by the processor 320 as it executes the arbiter module 370.

According to yet another alternative embodiment, the arbiter module 370 minimally causes the processor 320 to authorize one consuming process by minimally causing the processor 320 to receive a request for random bits (e.g. from a consuming process 371) and issue a semaphore in response to the request. This alternative embodiment of the arbiter module 370 causes the processor 320 to dwell the arbitration process until the semaphore is received back to the consuming process 371. In all these examples, the notion of issuing and retrieving semaphores can be visualized as a request and acknowledge process as illustrated in the figure.

According to yet another alternative embodiment, the output module 350, when executed by the processor 320, minimally causes the processor to allow an authorized consuming process 371 to access the buffer 360 so long as the buffer 360 is not empty. In the event that the buffer region 360 becomes depleted, the output module, which interacts with the arbiter module 370 in order to maintain cognizance of the quantity of random bits available in the buffer region 360, will issue a signal to the input module 340. This signal is called "depleted". In response to the depleted signal, the processor 320, will execute the input module 340 that will minimally cause the processor 320 to store additional bits in the buffer 360. In an alternative embodiment of the output module 350, the output module will issue an "abate" signal to the consuming process 371 when the buffer 360 is empty. In response, the consuming process will relinquish any semaphore received from the arbiter module 370.

While this method, apparatus, and switch have been described in terms of several alternative methods and exemplary embodiments, it is contemplated that alternatives, modifications, permutations, and equivalents thereof will become apparent to those skilled in the art upon a reading of the specification and study of the drawings. It is therefore intended that the true spirit and scope of the appended claims include all such alternatives, modifications, permutations, and equivalents.

What is claimed is:

1. A method for providing random bits comprising:
   storing random bits in a buffer;
   retrieving a quantity of random bits from the buffer at a source location;
   altering the random bits in the buffer at the source location;
   generating a new quantity of random bits based on the retrieved quantity of random bits;
   advancing the source location to the next location in the buffer; and
   placing the source location to the beginning of the buffer plus an offset when the next source location is beyond the limit of the buffer.

2. The method of claim 1 wherein storing random bits comprises:
   storing a quantity of random bits in a buffer at a destination location;
   advancing the destination location to the next destination location in the buffer; and
   placing the destination location at the beginning of the buffer plus an offset when the next destination location is beyond the limit of the buffer.

3. The method of claim 1 wherein storing random bits comprises:
   organizing the buffer into blocks;
   storing a quantity of random bits in a first block at a chosen destination location;

advancing the destination location to a chosen destination location in a different block in the buffer; and placing the destination location to a chosen destination location in a different block to the beginning of the buffer plus an offset when the next destination location is beyond the limit to the buffer.

4. The method of claim 1 wherein storing random bits comprises:

organizing the buffer into blocks;

storing a quantity of random bits in a first block at a chosen destination location; and advancing the destination location to a destination location in a different chosen block in the buffer wherein the chosen block is chosen with preference for a least recently updated block.

5. The method of claim 1 wherein altering the random bits in the buffer at the source location comprises incrementing a digital value comprised of the quantity of random bits at the source location.

6. The method of claim 1 wherein generating a new quantity of random bits comprises applying a one-way hash function to the selected first quantity of random bits.

7. An apparatus for providing random bits comprising:

buffer;

input manager that is capable of receiving random bits and storing said random bits in the buffer; and output manager that is capable of:

retrieving a quantity of random bits from the buffer at a source location;

altering the random bits in the buffer at the source location;

generating a new first quantity of bits based on the retrieved quantity of random bits;

advancing the source location to a next location in the buffer; and placing the source location to the beginning of the buffer plus an offset when the next source location is beyond the limit of the buffer.

8. The apparatus of claim 7 wherein the input manager comprises:

input register that is capable of holding a quantity of random bits;

destination pointer that is capable of generating a write address;

incrementer that is capable of incrementing a value stored in the destination pointer; and input controller that is capable of:

loading random bits into the input register;

issuing a write signal to the buffer when the input register is holding random bits;

commanding the incrementer to increment the destination pointer after the write signal is de-asserted.

9. The apparatus of claim 7 wherein the input manager comprises:

input register that is capable of holding a quantity of random bits;

destination pointer that is capable of generating a write address that includes a block identification field;

incrementer that is capable of incrementing the block identification field; and input controller that is capable of:

loading random bits into the input register;

issuing a write signal to the buffer when the input register is holding random bits;

commanding the incrementer to increment the block identification field of the destination pointer after the write signal is de-asserted.

10. The apparatus of claim 7 wherein the input manager comprises:

input register that is capable of holding a quantity of random bits;

destination pointer that is capable of generating a write address that includes a block identification field;

block selector that is capable of loading the block identification field with an indicator according to a least recently updated block; and input controller that is capable of:

loading random bits into the input register;

issuing a write signal to the buffer when the input register is holding random bits;

commanding the block selector to update the block identification field of the destination pointer after the write signal is de-asserted.

11. The apparatus of claim 7 wherein the output manager comprises:

output register for holding random bits received from the buffer;

value incrementer capable of incrementing the numeric value of bits held in the output register; and output controller capable of issuing a write signal to the buffer when an output of the value incrementer is available at said buffer.

12. The apparatus of claim 7 wherein the output manager comprises: output register for holding random bits received from the buffer;

transformation table that generates an output based on an input received from the output register and wherein the transformation table is loaded with a one-way hash function; and output controller that issues a capture signal to the output register that causes the output register to store random bits.

13. A random bit provisioning unit comprising: processor for executing instructions;

memory; and instruction sequences stored in the memory including:

input process instruction sequence that, when executed by the processor, minimally causes the processor to store random bits in a buffer region in the memory; and output process instruction sequence that, when executed by the processor, minimally causes the processor to:

retrieve a quantity of random bits from the buffer region in the memory at a source location;

alter the random bits at the source location;

generate a new quantity of random bits based on the retrieved quantity of random bits;

advance the source location to the next location in the buffer region; and place the source location to the beginning of the buffer region plus an offset when the next location is beyond the limit of the buffer region.

14. The random bit provisioning unit of claim 13 wherein the input process instruction sequence includes a write module instruction sequence that causes the processor to store random bits by minimally causing the processor to:

store a quantity of random bits in the buffer region at a destination address;

advance the destination address to the next location in the buffer region;

place the destination address to the beginning of the buffer region plus an offset when the next destination address is beyond the range of the buffer region.

15. The random bit provisioning unit of claim 13 wherein the input process instruction sequence includes a write module instruction sequence that causes the processor to store random bits by minimally causing the processor to:
  store a quantity of random bits in the buffer region at a destination address;
  advance the destination address to the next location in different block in the buffer region;
  place the destination address to the beginning of the buffer region plus an offset when the next destination address is beyond the range of the buffer region.

16. The random bit provisioning unit of claim 13 wherein the input process instruction sequence includes a write module instruction sequence that causes the processor to store random bits by minimally causing the processor to:
  store a second quantity of random bits in the buffer region at a destination address; and
  advance the destination address to the next location in different block in the buffer region wherein the different block is chosen according to a least updated block.

17. The random bit provisioning unit of claim 13 wherein the output process instruction sequence includes an increment instruction sequence that causes the processor to alter the random bits at the source location by minimally causing the processor to increment in the buffer region in the memory a digital value representing the retrieved quantity of random bits.

18. The random bit provisioning unit of claim 13 wherein the output process instruction sequence includes a transform function that causes the processor to generate a new quantity of random bits by minimally causing the processor to apply a one-way hash function to the retrieved quantity of random bits.

19. A computer-readable medium having computer-executable functions for providing a random bit stream comprising:
  input process instruction sequence that, when executed by a processor, minimally causes the processor to store random bits in a buffer region in the memory; and
  output process instruction sequence that, when executed by a processor, minimally causes the processor to:
    retrieve a quantity of random bits from the memory at a source location;
    alter the random bits at the source location;
    generate a new quantity of random bits based on the retrieved first quantity of random bits;
    advance the source location to the next location in the buffer region; and
    place the source location to the beginning of the buffer region plus an offset when the next location is beyond the limit of the buffer region.

20. The computer-readable medium of claim 13 wherein the input process instruction sequence includes a write module instruction sequence that causes the processor to store random bits by minimally causing the processor to:
  store a quantity of random bits in the buffer region at a destination address;
  advance the destination address to the next location in the buffer region;
  place the destination address to the beginning of the buffer region plus an offset when the next destination address is beyond the range of the buffer region.

21. The computer-readable medium of claim 13 wherein the input process instruction sequence includes a write module instruction sequence that causes the processor to store random bits by minimally causing the processor to:
  store a quantity of random bits in the buffer region at a destination address;
  advance the destination address to the next location in a different block in the buffer region;
  place the destination address to the beginning of the buffer region plus an offset when the next destination address is beyond the range of the buffer region.

22. The computer-readable medium of claim 13 wherein the input process instruction sequence includes a write module instruction sequence that causes the processor to store random bits by minimally causing the processor to:
  store a quantity of random bits in the buffer region at a destination address; and
  advance the destination address to the next location in different block in the buffer region wherein the different block is chosen according to a least recently updated block.

23. The computer-readable medium of claim 13 wherein the output process instruction sequence includes an increment instruction sequence that causes the processor to alter the random bits at the source location by minimally causing the processor to increment in the buffer region in the memory a digital value representing the retrieved quantity of random bits.

24. The computer-readable medium of claim 13 wherein the output process instruction sequence includes a transform function that causes the processor to generate a new quantity of random bits by minimally causing the processor to apply a one-way hash function to the retrieved quantity of random bits.

25. An apparatus for providing random bits comprising:
  means for storing random bits in a buffer;
  means for retrieving a quantity of random bits from the buffer at a source location;
  means for altering the random bits in the buffer at the source location;
  means for generating a new quantity of random bits based on the retrieved quantity of random bits;
  means for advancing the source location to the next location in the buffer; and
  means for placing the source location to the beginning of the buffer plus an offset when the next location is beyond the range of the buffer.

26. The apparatus of claim 25 wherein the means for storing random bits in the buffer comprises:
  means for storing a quantity of random bits in a buffer at a source location;
  means for advancing the destination location to the next destination location in the buffer; and
  means for placing the destination location at the beginning of the buffer plus an offset when the next destination location is beyond the limit of the buffer.

27. The apparatus of claim 25 wherein the means for storing random bits in the buffer comprises:
  means for organizing the buffer into blocks;
  means for storing a quantity of random bits at a chosen destination location in a first block in the buffer;
  means for advancing the destination location to chosen destination location in a different block in the buffer; and
  means for placing the destination location to a chosen destination location in a different block at the beginning of the buffer plus an offset when the next destination location is beyond the limit of the buffer.

28. The apparatus of claim 25 wherein the means for storing random bits in the buffer comprises:
  means for organizing the buffer into blocks;
  means for storing a quantity of random bits in a first block at a chosen destination location; and means for advancing the destination location to a destination location in a different chosen block wherein the block is chosen according to a least recently updated block.

29. The apparatus of claim 25 wherein the means for altering the random bits in the buffer at the source location comprises means for incrementing a digital value comprised of the retrieved quantity of random bits.

30. The apparatus of claim 25 wherein the means for generating a new quantity of random bits based on the retrieved quantity of random bits comprises a means for applying a one-way hash function to the retrieved quantity of random bits.

31. A method for providing random bits comprising:
receiving random bits into a buffer;
receiving a request for random bits from a consuming process;
authorizing the consuming process to access the buffer while precluding other processes from accessing the buffer; and
providing random bits from the buffer to the authorized consuming process, wherein providing random bits comprises:
providing random bits from the buffer when the buffer is not empty; and
receiving additional random bits into the buffer when the buffer becomes depleted.

32. The method of claim 31 wherein receiving random bits into a buffer comprises:
receiving a semaphore;
storing random bits into a buffer; and
relinquishing the semaphore when no other random bits are to be stored in the buffer.

33. The method of claim 31 wherein authorizing the consuming process comprises:
providing a semaphore to the consuming process when a sufficient quantity of random bits is present in the buffer; and
waiting for the consuming process to return the semaphore.

34. The method of claim 31 wherein authorizing the consuming process comprises:
providing a semaphore to the consuming process; and
waiting for the consuming process to return the semaphore.

35. The method of claim 31 wherein providing random bits comprises:
allowing the consuming process to retrieve random bits from the buffer; and
requiring the consuming process to abate when the buffer is empty.

36. An apparatus for providing random bits comprising:
buffer;
input manager that is capable of receiving random bits and storing said random bits in the buffer;
arbiter capable of selecting a request from among a plurality of requests for random bits; and
output manager that is capable of providing a quantity of random bits in response to the selected request.

37. The apparatus of claim 36 wherein input manager comprises a buffer request unit that issues a buffer request signal to an arbiter when random bits are to be stored in the buffer and stores random bits into the buffer when it receives a buffer grant signal.

38. The apparatus of claim 36 wherein the arbiter accepts a request in the form of a demand quantity indicator and issues a grant signal when a sufficient quantity of random bits are available in the buffer to satisfy the request according to the demand quantity indicator and wherein the output manager retrieves a quantity of random bits from the buffer when the arbiter issues a grant signal.

39. The apparatus of claim 36 wherein the arbiter issues a single corresponding grant signal in response to a plurality of request signals and maintains the corresponding grant signal as long as a corresponding request signal remains active and wherein the output manager retrieves a quantity of random bits from the buffer when the arbiter issues a grant signal.

40. The apparatus of claim 36 wherein the input manager stores additional random bits into the buffer when the buffer is depleted.

41. The apparatus of claim 36 wherein the arbiter de-asserts a grant request when the buffer is empty.

42. A random bit provisioning unit comprising:
processor for executing instructions;
memory; and
instruction sequences stored in the memory including:
arbitration process instruction sequence that, when executed by the processor, minimally causes the processor to authorize one consuming process in response to a request for random bits from one or more consuming processes;
input process instruction sequence that, when executed by the processor, minimally causes the processor to store random bits in a buffer region in the memory; and
output process instruction sequence that, when executed by the processor, minimally causes the processor to:
provide random bits to an authorized consuming process while precluding a non-authorized consuming process from access said buffer region,
wherein the output process instruction sequence minimally causes the processor to provide random bits by minimally causing the processor to:
allow an authorized consuming process to retrieve random bits from the buffer region when the buffer region is not empty; and
store additional bits in the buffer region when the buffer region becomes depleted.

43. The random bit provisioning unit of claim 42 wherein the input process instruction sequence minimally causes the processor to store random bits in a buffer region by minimally causing the processor to:
receive a semaphore;
store random bits in the buffer region; and
relinquish the semaphore when it is finished storing random bits in the buffer region.

44. The random bit provisioning unit of claim 42 wherein the arbitration process instruction sequence minimally causes the processor to authorize one consuming process by minimally causing the processor to:
receive a request for random bits that includes a demand quantity indicator;
issue a semaphore to a consuming process in response to the request when a sufficient quantity of random bits is available in the buffer region according to the demand quantity indicator; and
dwell the arbitration process until the semaphore is received back from the consuming process.

45. The random bit provisioning unit of claim 42 wherein the arbitration process instruction sequence minimally causes the processor to authorize one consuming process by minimally causing the processor to:
   receive a request for random bits;
   issue a semaphore to a consuming process in response to the request; and
   dwell the arbitration process until the semaphore is received back from the consuming process.

46. The random bit provisioning unit of claim 42 wherein the output process instruction sequence minimally causes the processor to provide random bits by minimally causing the processor to:
   allow an authorized consuming process to retrieve random bits from the buffer region; and
   direct the consuming process to relinquish a semaphore back to the arbitration process when the buffer region is empty.

47. A computer readable medium having computer-executable functions for providing random bits comprising:
   arbitration process instruction sequence that, when executed by a processor, minimally causes the processor to authorize one consuming process in response to a request for random bits from one or more consuming processes;
   input process instruction sequence that, when executed by a processor, minimally causes the processor to store random bits in a buffer region in a memory; and
   output process instruction sequence that, when executed by a processor, minimally causes the processor to:
      provide random bits to an authorized consuming process while precluding a non-authorized consuming process from access said buffer region,
   wherein the output process instruction sequence minimally causes a processor to provide random bits by minimally causing the processor to:
      allow an authorized consuming process to retrieve random bits from a buffer region in a memory when the buffer region is not empty; and
      store additional bits in the buffer region when the buffer region becomes depleted.

48. The computer readable medium of claim 47 wherein the input process instruction sequence minimally causes a processor to store random bits in a buffer region by minimally causing the processor to:
   receive a semaphore;
   store random bits in a buffer region in a memory; and
   relinquish the semaphore when it is finished storing random bits in the buffer region.

49. The computer readable medium of claim 47 wherein the arbitration process instruction sequence minimally causes a processor to authorize one consuming process by minimally causing the processor to:
   receive a request for random bits that includes a demand quantity indicator;
   issue a semaphore to a consuming process in response to the request when a sufficient quantity of random bits is available in a buffer region in a memory according to the demand quantity indicator; and
   dwell the arbitration process until the semaphore is received back from the consuming process.

50. The computer readable medium of claim 47 wherein the arbitration process instruction sequence minimally causes a processor to authorize one consuming process by minimally causing the processor to:
   receive a request for random bits;
   issue a semaphore to a consuming process in response to the request; and
   dwell the arbitration process until the semaphore is received back from the consuming process.

51. The computer readable medium unit of claim 47 wherein the output process instruction sequence minimally causes a processor to provide random bits by minimally causing the processor to:
   allow an authorized consuming process to retrieve random bits from the buffer region; and
   direct the consuming process to relinquish a semaphore back to the arbitration process when the buffer is empty.

52. An apparatus for providing random bits comprising:
   means for receiving random bits;
   means for receiving a request for random bits;
   means for authorizing a consumer of random bits to receive the received random bits while preventing other consumers from accessing the random bits; and
   means for providing random bits to an authorized consumer,
   wherein the means for providing random bits comprises:
      means for providing random bits from a buffer when the buffer is not empty; and
      means for receiving additional random bits into the buffer when the buffer is depleted.

53. The apparatus of claim 52 wherein the means for receiving random bits comprises:
   means for receiving a semaphore;
   means for storing random bits in a buffer; and
   means for relinquishing the semaphore when no additional random bits are to be stored in the buffer.

54. The apparatus of claim 52 wherein the means for authorizing a consumer comprises:
   means for providing a semaphore to a consuming process when a sufficient quantity of random bits is available to satisfy the request for random bits; and
   means for dwelling an authorization process until the consuming process returns the semaphore.

55. The apparatus of claim 52 wherein the means for authorizing a consumer comprises:
   means for providing a semaphore to a consuming process; and
   means for dwelling an authorization process until the consuming process returns the semaphore.

56. The apparatus of claim 52 wherein the means for providing random bits comprises:
   means for allowing a consuming process to receive random bits from the buffer; and
   means for requiring the consuming process to relinquish a semaphore when the buffer is empty.

* * * * *